United States Patent
Diederichs et al.

(10) Patent No.: US 7,447,353 B2
(45) Date of Patent: Nov. 4, 2008

(54) METHODS FOR QUALITATIVE EVALUATION OF A MATERIAL WITH AT LEAST ONE IDENTIFICATION CHARACTERISTIC

(75) Inventors: Carsten Diederichs, Lemgo (DE); Volker Lohweg, Bielefeld (DE); Jörn Sacher, Hiddenhausen (DE); Bernd Rüdiger Stöber, Rheda-Wiedenbrück (DE); Thomas Türke, Bielefeld (DE); Harald Heinrich Willeke, Paderborn (DE)

(73) Assignee: Koenig & Bauer Aktiengesellschaft, Wurzburg (DE)

(*) Notice: Subject to any disclaimer, the term of this patent is extended or adjusted under 35 U.S.C. 154(b) by 584 days.

(21) Appl. No.: 10/550,889

(22) PCT Filed: Mar. 26, 2004

(86) PCT No.: PCT/EP2004/050378
§ 371 (c)(1),
(2), (4) Date: Sep. 27, 2005

(87) PCT Pub. No.: WO2004/086291
PCT Pub. Date: Oct. 7, 2004

(65) Prior Publication Data
US 2006/0251320 A1    Nov. 9, 2006

(30) Foreign Application Priority Data
Mar. 28, 2003    (DE) .......................... 103 14 071

(51) Int. Cl.
*G06K 9/00* (2006.01)
(52) U.S. Cl. .................................... 382/165
(58) Field of Classification Search ......... 382/100–102, 382/112, 141, 155–159, 162, 164–165, 181, 382/218–225; 348/86, 88, 92, 125, 129–130; 356/71, 388, 390, 392, 393, 394, 429–431; 250/559.07, 559.39
See application file for complete search history.

(56) References Cited

U.S. PATENT DOCUMENTS
5,256,883 A    10/1993    Weichmann et al.
(Continued)

FOREIGN PATENT DOCUMENTS
CH        684222 A5    7/1994
(Continued)

OTHER PUBLICATIONS

C. Lucht, K. -H Franke, "Quality Control of Imprinted, Textile Web Material—Selection Solution Method for Inspecting Color Patterns", 5th Workshop Color Image Processing, Publication Series of ZBS e.V., Report No. 1/99, Ilmenau, 1999, 9 pages, ISSN 1432-3346; Workshop on Oct. 2007 and Aug. 1999 (3 pages).
(Continued)

*Primary Examiner*—Jose L Couso
(74) *Attorney, Agent, or Firm*—Jones, Tullar & Cooper, PC

(57) ABSTRACT

A material, with at least one identification characteristic, is subjected to a qualitative evaluation. A color image of this at least one identification characteristic is taken using an electronic image sensor which produces an electrical signal that is evaluated by an evaluation device. Another electrical signal is obtained from at least one reference image and is stored in a data memory. The second electric signal, has a set point value, for the first electric signal, for at least two set point values contained in the reference image. The first signal is compared to at least two set point values in the second image. The color image of the identification characteristic is tested for deviation from the reference. The identification characteristic is checked for association with at least one aspect of the identification characteristic of the material. The tasks are carried out in a continuous working process being carried out by a machine, such as a printing machine, during a continuous printing process.

82 Claims, 8 Drawing Sheets

U.S. PATENT DOCUMENTS

| | | | |
|---|---|---|---|
| 5,384,859 | A | 1/1995 | Bolza Schunemann et al. |
| 5,503,262 | A | 4/1996 | Baudat et al. |
| 5,522,491 | A | 6/1996 | Baudat et al. |
| 5,602,938 | A | 2/1997 | Akiyama et al. |
| 5,659,630 | A * | 8/1997 | Forslund ............... 382/149 |
| 6,069,973 | A | 5/2000 | Lin et al. |
| 6,111,261 | A | 8/2000 | Bolza-Schunemann et al. |
| 6,272,248 | B1 * | 8/2001 | Saitoh et al. ............ 382/218 |
| 6,289,125 | B1 * | 9/2001 | Katoh et al. ............. 382/194 |
| 6,516,078 | B1 | 2/2003 | Yang et al. |
| 6,558,054 | B2 * | 5/2003 | Haller ..................... 400/76 |
| 6,580,820 | B1 | 6/2003 | Fan |
| 6,654,048 | B1 | 11/2003 | Barrett-Lennard et al. |
| 6,714,676 | B2 * | 3/2004 | Yamagata et al. ......... 382/175 |
| 6,960,036 | B1 * | 11/2005 | Fujita et al. ............ 400/124.11 |
| 7,113,620 | B2 * | 9/2006 | Shiotani .................. 382/112 |
| 7,388,978 | B2 * | 6/2008 | Duvdevani et al. ........ 382/145 |
| 2001/0040588 | A1 | 11/2001 | Shiraiwa et al. |
| 2002/0039446 | A1 | 4/2002 | Santoni |
| 2004/0179724 | A1 | 9/2004 | Sacher et al. |

FOREIGN PATENT DOCUMENTS

| | | |
|---|---|---|
| DE | 196 13 082 A1 | 9/1997 |
| DE | 198 02 781 A1 | 7/1999 |
| DE | 41 36 461 C2 | 8/1999 |
| DE | 200 10 920 U1 | 10/2000 |
| DE | 199 40 879 A1 | 8/2001 |
| DE | 101 32 589 A1 | 1/2003 |
| DE | 203 03 574 U1 | 5/2003 |
| DE | 102 34 086 A1 | 2/2004 |
| EP | 1 059 800 A2 | 12/2000 |
| JP | 11-41478 | 2/1999 |
| JP | 2001-16607 | 1/2001 |
| WO | WO 98/39627 | 9/1998 |

OTHER PUBLICATIONS

K. -H Franke, H. Kempe, C. Lucht, "Automating the Industrial Material Inspection in Connection with Complex Patterned Web-Shaped Material—A Challenge to Image Analysis," Conference Report, 42nd International Scientific Colloquim, Techn. University Ilmenau, 1997, 7 pages.

T. Johnson, "Methods for Characterizing Colour Scanners and Digital Cameras," Displays, Elsevier Science Publishers B.V., Barking, GB, Bd. 16, Nr. 4, 1. Mai 1996 (May 1, 1996), Seiten 183-191, XPO04032520, ISSN 0141-9382.

C. Lucht, C. Nowack, O. -S, "Novel Image Processing Technologies for the Automated OPtical Control of Structured Surfaces During Production," Project No. 216, Final Report, AS, Research Committee Mechanical Engineering e.V., Frankfurt (Main); FKM, 2000, 125 p. (Research Publication / Research Committee Mechanical Engineering e.V., No. 250).

Lohweg and Muller, "A Generalized Method for Calculating Transformation-Invariable Circular Transformations for Application in Signal and Image Processing," pp. 213 to 220, DAGM Symposium, Sep. 13 to 15, 2000.

* cited by examiner

METHODS FOR QUALITATIVE EVALUATION OF A MATERIAL WITH AT LEAST ONE IDENTIFICATION CHARACTERISTIC

CROSS-REFERENCE TO RELATED APPLICATIONS

This patent application is the U.S. national phase, under 35 USC 371, of PCT/EP2004/050378, filed Mar. 26, 2004; published as WO 2004/086291 A2 on Oct. 7, 2004, and claiming priority to DE 103 14 071.9, filed Mar. 28, 2003, the disclosures of which are expressly incorporated herein by reference.

FIELD OF THE INVENTION

The present invention is directed to methods for the qualitative evaluation of a material having at least one identifying characteristic A color image is recorded by an electronic image sensor of at least the identifying characteristic.

BACKGROUND OF THE INVENTION

Camera systems are increasingly employed in the printing industry in connection with various applications, such as, for example, in inspection systems, in path monitoring systems or in registration measuring systems. These systems are typically arranged for use with a printing press or with a machine which processes material to be imprinted. Moreover, there is a requirement that these systems should perform their functions "in-line", integrated into the working process of the printing press or of the machine processing material to be imprinted. This "in-line" requirement presents a considerable challenge to the respective camera system because of the large amount of data provided by the camera system and because of the rapid process speed of the printing press or of the machine processing the material to be imprinted. It is difficult, for example, to obtain a dependable evaluation, preferably of each identifying characteristic, and even of identifying characteristics which are difficult to identify by spectral photometry, in spite of the high transport speed of the material, during the short time available for making an evaluation in the course of a quality control. Electronic image sensors (are often used in such camera systems for recording images. In particular, these systems often use color cameras with an image sensor consisting of a CCDchip, whose light-sensitive pixels provide an output signal, usually, for example, in three separate signal channels, primarily for the colors red, green and blue, that are corresponding to the color recorded in the observed range.

A problem that exists with known camera systems in connection with testing colored material, and in particular with testing material imprinted in colors, consists in that the image data provided by the color cameras often do no correspond to the color perception of the human eye. Unprocessed image data received from these color cameras are often insufficient with respect to color balance, brightness, contrast and color tone reproduction with respect to the color match corresponding to the human color perception. The main reason for this problem, besides the insufficiencies of lenses and illumination devices, is the spectral sensitivity distribution of the color cameras which are employed. If the sensitivity distributions of the color cameras employed does not match the sensitivity distribution of the human eye. The result is that, in the course of subsequent further processing, for example when the image data is displayed on a color monitor, the image data provided by the color cameras lead to a false visual impression. During checking, a reasonable qualitative evaluation of the imprinted material is hardly possible for this reason alone.

As a result of previous production processes, it can occur that the position of a detection characteristic to be evaluated during the checking process varies within certain tolerance limits in a defined expected range. For example, the position of a window thread, such as is used, for example, in connection with bills or with stamps, in relation to the print image of the bills or stamps on a printed sheet, can vary because of the properties of the production process for producing the window thread. Such acceptable position deviations of certain identifying characteristics can generate a malfunction report in inspection systems, since a print pattern defined as a reference value is compared sequentially, print position by print position, with the actual printed image. The result is that deviations in the position of identifying characteristics are detected as errors, although they are, in fact, not errors.

For example, a method is known from DE 196 13 082 A2, wherein an imprinted material, such as, for example, a print sheet imprinted with bills and provided with a silver thread, hologram or kinegram, is illuminated by an illuminating device in such a way that the light reflected by the imprinted material enters a photoelectric sensor. The image taken by the photoelectric sensor can thereafter be evaluated in an evaluating device, such as, for example, in a standard computer provided with suitable evaluation software, and can be checked for printing errors. However, in this case, it is a requirement, for conducting the evaluation, that an identifying characteristic, whose position varies, have a sufficiently high reflecting capability, if, for example, it is embodied as a shiny silver thread. Accordingly, it is disadvantageous that, after having been recorded by the use of the photoelectric sensor, that identifying characteristics, whose image properties do not differ sufficiently strongly from the image properties of the remaining print image, such as is the case with, for example, colored window threads, cannot be detected by the evaluation device with sufficient reliability.

A method for the qualitative evaluation of a material with at least one identifying characteristic is known from DE 101 32 589 A1. An image of the material to be evaluated is recorded by an image sensor. The geometric contours and/or the relative arrangement of several identifying characteristics of this image are evaluated, with respect to each other, in an evaluation device.

A method for signal evaluation of an electronic image sensor, in connection with detecting the patterns of image contents of a test body, is known from post-published DE 102 34 086 A1. A decision regarding the assignment of the test body to a defined class of test bodies is made.

A measuring arrangement for identifying valuable objects by digital image analysis is known from DE 198 02 781 A. A narrow-band excitation light source, such as, for example, a tunable laser, illuminates a selected location area of the object with light within a narrow frequency range. Light, which is reflected by the object, or an emission that is induced in the object because of its being exposed to radiation, is, for example, detected by a photometrically calibrated CCD camera having a multitude of pixels, is digitized and is forwarded to a computer in the form of a data set characterizing each pixel and is stored in a memory. The photographically detected object can also be additionally surveyed, so that information regarding a geometric arrangement of various objects, their distance from each other or the depth of their relief structure, can be added to the data set. The data set which is prepared from this image detection can be made available, for example via the internet, and can be used for a comparison of this data set with a data set prepared for another object, in order to check the other object at the different location for determining its agreement with the first object, i.e. the original object, and therefore to check its genuineness.

An arrangement for the classification of a pattern, in particular of a bill or a coin, is known from CH 684 222 A5. A multi-stage classification system, which is capable of learning, sequentially performs at least three tests on a pattern by comparing characteristic vectors with vectorial desired values. A light source illuminates the pattern and a sensor measures the radiation reflected by the pattern at discrete points in time.

Methods for pattern recognition customarily determine similarities such as, for example, distance measurements on segmented objects, or their calculated global threshold distributions. These methods are based on translation-invariant initial spectra. However, situations often occur in real life, such as by object displacements underneath the recording system, for example, by the existence of different backgrounds during the recordings, or because of aliasing effects, so that in many cases a direct comparison of these initial spectra with stored reference values cannot be performed.

SUMMARY OF THE INVENTION

It is the object of the present invention to provide methods for the qualitative evaluation of a material with at least one identifying characteristic, which methods can be employed in the printing industry.

In accordance with the invention, this object is attained by recording a color image of the material having at least one identifying characteristic. A color image is recorded, using an electronic image sensor, of at least the identifying characteristic. At least one first electrical signal, which is correlated with the color image, is made either directly or indirectly by the image sensor. An evaluating device, which is connected with the image sensor, evaluates the electrical signal. A second electrical signal is obtained from a reference image and is stored in a data memory. The first and second signals are compared.

The advantages to be obtained by the present invention lie, in particular, in that a material, and in particular, an imprinted material with at least one identifying characteristic, can also be dependably qualitatively evaluated if the color image taken of the material, and in particular of the identifying characteristics, has optical properties which cannot be sufficiently identified by spectral photometric methods alone. The method of the present invention does not require that the material to be evaluated qualitatively have a distinctive reflection capability. It is thus possible to define practically any arbitrary, optically detectable property or condition of the material as its identifying characteristic, so that a clearly expanded application range of the method results. It is therefore possible to decide what the identifying characteristics should consist of as a function of the application. The test is solely dependent on there being an optically recognizable difference between the identifying characteristic and its surroundings. This difference is utilized for qualitatively evaluating the material, which evaluation can also include, for example, the material's identification or a test of its genuineness.

In particular, the proposed method leads to good results, if it is also assumed that the position of the identifying characteristic varies within an expected range which is determined by tolerance limits. Moreover, with respect to color hues, fullness and brightness, the colors picked up by the image sensor are arranged sufficiently accurately, in a color range which corresponds to the color perception of the human eye, so that the material is reproduced by a display device, such as, for example, by a color monitor, in the form of a color image in such true colors, as if the material were inspected directly by a human eye, so that a dependable qualitative evaluation of the material, and therefore also of its identifying characteristics, becomes possible by use of the color image.

The so-called CIELAB color range, which has found wide application in printing technology, for example, is suitable for use as the color range. An important characteristic quantity of color deviation in the CIELAB color range is provided by the color distance $\Delta E$ between the reference variables and the actual values of the parameters L, a and b, which characterize the CIELAB color range. The parameter L identifies the brightness, a identifies the red-green value and b identifies the yellow-blue value. These parameters are also called CIE values. Further characteristic quantities are the color hue difference $\Delta H$ and the fullness difference $\Delta C$, wherein the color hue difference $\Delta H$, in particular, is important as a characteristic quantity in multi-color printing. This is because an off color is subjectively perceived to be more disturbing than a fullness difference $\Delta C$ indicating a brightness difference. Thus, for example, a color distance $\Delta E$ of a value 1 means a non-visible color difference, a value of 2 means a small difference, a value of 3 means a recognizable difference, a value of 4 means a clear difference and, starting at a value of 5, a large difference. The value range of the CIE values a and b respectively extends from −100 for green or blue to +100 for red or yellow. The value range for brightness L extends from 0 (black, total absorption) to 100 (white, total reflection). The value triplet L=50, a=0, b=0 identifies a neutral medium gray.

Three types of cones (S, M, L) exist in the human eye, which cones absorb light entering in different spectral ranges. The maximum absorption of the S-type cones lies in the blue range, namely at 420 nm. The M-type cones maximally absorb light in the green spectral range, namely at 534 nm. The maximum of the L-type cones lies at 564 nm in the yellow/red spectral range. Perception by the use of three cone types is called tri-chromatic perception. Individual color perceptions are triggered by stimulation of different strength of the individual cone types. An identical stimulation of all cone types leads to the perception of the color white.

Color perception phenomena, such as color antagonism and color constancy, for example, cannot be explained by the tri-chromatic perception model. Color antagonism means that certain colors can never be seen in transition, so that no color transition between these colors is possible. Colors demonstrating color antagonism are called compensation colors or complementary colors. To be cited among these are the color pairs red/green and blue/yellow, as well as black/white. In color constancy the different spectral distribution of the light which, for example, is a function of the weather or of daylight conditions, is compensated.

Hering developed the compensation color theory in 1920 to explain these color perception phenomena in a way different from the classic tri-chromatic color model. The compensation color model assumes that the cones are arranged in receptive fields, namely in blue/yellow fields and red/green fields. In this case, receptive fields are understood to be neurons, as well as the manner in which the stimulation of the cones is further processed by the neurons. Two types of receptive fields are substantially responsible for color perception. The first receptive field obtains its input from the L- and M-cones, the second receptive field receives its input from the S-cones, together with differently weighted stimulations of the L- and M-cones. It is assumed that a subtractive color mixture is performed on the level of the neurons or receptive fields for stimulating the cones.

The RGB model is the tri-chromatic model for describing additive color images which is most used in technology. In the RGB model, the color range is described by the three basic colors red, green and blue. With this model, it is particularly disadvantageous that the description performed by use of the RGB model does not correspond with the perception of the human eye, since the behavior of the human perception in particular, i.e. the perception through the senses, is not being taken into consideration.

As a rule, electronic image sensors, and in particular CCD chips for color cameras, have a multitude of, such as, for example, a million or more, light-sensitive pixels, which are, for example, arranged in a matrix-shape, each of which pixel, as a rule, provides a first electrical signal corresponding to the colored light recorded in the observed area and correlated with the color image, which first electrical signal is split up, for example, in three signal channels which three signal channels are separated from each other. At the time of the observation, each signal channel makes available a portion of the first electrical signal mainly corresponding to one of the basic colors red, green and blue. Such a signal is called an RGB signal. Usefully, a spectral sensitivity of each signal channel®, G, B)is matched to the spectral sensitivity of the human eye, for example R=red to 564 nm, G=green to 534 nm and B=blue to 420 nm. Also, the first electrical signal, in its entirety, is matched with respect to hue, fullness and brightness, to the color perception of the human eye. Accordingly, a color image recorded by the use of such a color camera is composed of a multitude of image points.

The method in accordance with the present invention is now distinguished in that a second electrical signal is obtained from at least one reference image and is stored in a data memory. The second electrical signal constitutes at least a reference variable for the first electrical signal. By a comparison of the first signal with the second signal, at least the color image of the identifying characteristic is checked for a color deviation from the reference image, and/or the identifying characteristic is checked for its affiliation with a defined class of identifying characteristics, and/or for its affiliation with a defined geometric contour and/or for a relative arrangement with at least one further identifying characteristic of the material, each by a comparison of the first signal with the second signal for having reached the reference variable or an agreement therewith. To increase the test dependability, the material and/or its identifying characteristic is preferably simultaneously always checked with regard to at least two of the above mentioned criteria. To this end, at least two of the tests of the color image, and, in particular, the test of the identifying characteristic for a color deviation from a reference image, and the test of the identifying characteristic for its affiliation with a defined class of identifying characteristics or with a defined geometric contour, or a relative arrangement with further identifying characteristics of the material preferably take place, at the same time, in parallel test procedures which run independently of each other. By the use of the present method, an evaluation of imprinted material, in a running printing process of a printing press, or in a running work process of a machine, which further processes the imprinted material, is possible for accomplishing the quality control of this material. This is because of the resultant test dependability and because of the testing speed with which the performance of the present method takes place. This material constitutes, in particular, high-quality printed products which, for example for security reasons, require very careful testing, and on which great demands are made, regarding, for example, the stability of their condition with regard to print technology, i.e. bills and stamps, in particular.

Testing the color image, for color deviation of the color image from the reference image, preferably takes place in that the portion of the first signal from the color image made available in the first signal channel is linked by a first calculation prescription with the portion made available in the second signal channel. An output signal from a first compensation color channel is generated so that the portion of the first signal from the color image made available in the third channel is linked with the portions in the first and the second signal channel by a second calculation prescription, by the use of which an output signal from a second compensation color channel is generated. The output signals of the compensation color channels are classified by being compared with reference variables.

Testing the identifying characteristic, regarding its affiliation with a defined class of identifying characteristics, is preferably performed in that the first electrical signal made available by the image sensor is converted by the use of at least one calculation prescription into a translation-invariable signal with at least one characteristic value. The identifying characteristic is weighted with at least one fuzzy association function. A higher-order fuzzy association function is generated by linking all association functions by use of a calculation prescription consisting of at least one rule. A sympathetic value is determined from the higher-order fuzzy association function. The sympathetic value is compared with a threshold value. As a function of the result of this comparison, a decision is made regarding the affiliation of the identifying characteristic with a defined class of identifying characteristics.

Testing of the identifying characteristic, regarding a defined geometric contour, and/or a relative arrangement with at least one further identifying characteristic of the material, preferably takes place in that at least one background reference variable and at least one mask reference variable are stored in the memory. The background reference variable represents at least one property of the material to be evaluated in at least one portion of an area of the vicinity surrounding the identifying characteristic. The mask reference variable represents the geometric contour of the identifying characteristic or the relative arrangement of several identifying characteristics among each other. In the course of testing the material, a difference value, at least of the expected range, is formed from the first electrical signal made available by the image sensor and from the background reference variable. The actual position of the identifying characteristic is derived from a comparison of the difference value with the mask reference variable. For the qualitative evaluation of the material the portion of the material to be evaluated, which results from the actual position of the identifying material, is blanked out.

The adaptation of the first electrical signal to the color perception of a human's eye takes place in that the RGB signal made available by the image sensor at every observation time is considered to be a vectorial output signal. The coefficients of the RGB signal vector are multiplied with a correction matrix which is quadratic in particular, so that all portions of the first electrical signal represented in a signal channel are approximated to the color perception of the human eye. By multiplying the RGB signal vector by a correction matrix, a relatively accurate interrelation of all print colors in a basically arbitrary color range is achieved. Moreover, a matching of the RGB signal vector, by use of the multiplication with the correction matrix, can be easily realized by use of data technology, so that an implementation into an actual system is possible even with large amounts of RGB signals which are made simultaneously available by a multitude of pixels of the image sensor.

The coefficients of the correction matrix are, of course, of decisive importance for the quality of the proposed correction of the RGB signals since, depending on the selection of these coefficients, the RGB signal vectors are transformed in different ways. For example, the coefficients of the correction matrix can consist of empirical values. They are stored in a data memory.

To match the coefficients of the correction matrix variably to different side constraints, such as, for example, regarding the color camera used, to the illumination conditions, or to the lenses used, an iterative approximation algorithm is proposed. A reference color chart, such as, for example, an IT8 chart with 288 color fields, is preset for performing this approximation algorithm. The different reference colors are represented in the color fields. Moreover, the assignment of the different reference colors to a suitable color range, for example, to the CIELAB color range, is known. From these preset CIELAB values for the various reference colors of the reference color chart, it is possible, by the use of known transformations, to calculate corresponding reference variables for the three signal channels. Thus, a reference color chart is preset as the input value for the approximation algorithm, and for each reference color as a vector with a reference variable for each color channel as a desired result of the conversion. In the course of performing the approximation algorithm for the determination of the coefficients of the correction matrix, the reference color chart is recorded by use means of the image sensor of the color camera, and an RGB signal vector is determined for each color field. The difference between these RGB signal vectors of the color camera and the vector with the preset reference variables corresponds to the difference between the color perception of the human eye and the sensitivity distribution of the color camera.

In order not to have to calibrate the illumination source to a standard light source, when using respective camera systems, it is possible to perform a further correction step. In this further correction step, the coefficients of the RGB signal vectors are converted in such a way that the result corresponds to those RGB signal vectors which would be obtained when illuminating the observation area by the use of standard light. The color correction values for use in matching the RGB signal vectors to different illumination sources and changes can be advantageously calculated in the following way.

At present, the standard light D50 is still being used in printing technology. By specifying the illuminant D50, it is possible to adapt Rec. 709 to D50 standard light by a conversion so that the non-linear RGB signal vectors behave as if the object to be tested were illuminated by D50 illumination. It is possible, by use of the method of the present invention, to match the RGB signal vectors iteratively to the CIELAB color range without an actual standard illumination being necessary. This method has the advantage that, in case of an expected change of the specified standard light, a match can immediately be provided.

The starting point of the iteration is a correction matrix whose coefficients have been preset as the initial values. These initial values can either be selected purely accidentally, or corresponding to defined empirical values. In the first iteration step, this correction matrix is now multiplied by all of the RGB signal vectors made available by the image sensor, and the corrected RGB vectors thus obtained are temporarily stored in a data memory. Subsequently, the coefficients of the correction matrix are slightly changed, and the multiplication is again performed. The change of the coefficients of the correction matrix is respectively only performed if the corrected RGB signal vectors approximate the vectors with the preset reference variables.

The approximation of the corrected RGB signal vectors to the vectors with the preset reference variables is weighted for each iteration step in order to be able to determine by this weighting, whether the change of the coefficients of the correction matrix performed made in this iteration step is to be accepted or discarded. An advantageous weighting method provides, that for each color field of the reference color chart, the difference value between the corrected RGB signal vector and the vector with the preset reference values for this color field is determined and the sum of all these difference values is added. The change of the correction coefficients of the correction matrix in the actual iteration step is only accepted if the sum of all difference values in this actual iteration step has become smaller, in comparison to the sum of all difference values in the previous iteration step. If the sum of all difference values has become greater, because of the change of the coefficients of the correction matrix in the previous iteration step, the change of the coefficients is discarded. By use of this summary consideration of the difference values of all reference colors, it is easily possible that the difference between individual reference colors is increased during an iteration step. However, as a whole, the minimization of the difference values is dependably assured over all signal channels.

A further problem in connection with the use of camera systems is the correct setting of the color balance, i.e. the correct weighting of the various signal channels with respect to each other. In order to adjust the color balance of the individual signal channels relative to each other, the coefficients of each RGB signal vector can be multiplied with a correction factor which is a function of the signal channel. At the same time, a correction factor is added to each RGB signal vector. This correction of the three signal channels of each RGB signal vector corresponds to a linear displacement of the individual coefficients of the RGB signal vectors.

A particularly good color balance is achieved if the correction vector, and the correction vectors which are a function of the signal channels, are selected in such a way that the corrected RGB signal vectors obtained by the application of the correction by use of the correction vector and of the correction factors for the two fields with the reference gray values black and white substantially correspond exactly to the vectors with the preset reference variables of these two color fields. In other words, this means that the linear displacement of the RGB signal vectors is selected to be such that corrected results are obtained for the two reference gray values black and white which correspond to the color perception of the human eye. Preferably, this linear displacement is applied to all of the RGB signal vectors, so that brightness and contrast are automatically also corrected over the entire color spectrum.

When using color cameras, color distortions and a reduction of intensity, particularly at the edges of the camera images, can occur. These distortions are generated by the optical devices used, such as, for example, by the lenses used. A so-called shading correction can be employed to correct this intensity reduction. To this end, correcting factors, as a function of the signal channel, are specified for each pixel. By multiplying these pixel-dependent correction factors with the coefficients of the RGB signal vectors, it is possible to compensate for the pixel-specific color distortions or for a reduction of the intensity because of the structural type in the various areas of the image sensor.

For example, it is possible to detect these pixel-specific, signal channel-dependent correction factors experimentally in a simple manner. The observed area of the color camera is lined with a homogeneous material, and in particular with a homogeneous white material, and an RGB signal vector is determined for each pixel by use of the camera. The RGB signal vector having the highest value coefficients, and which therefore represents the brightest location in the observed area, is filtered out of these RGB signal vectors. However, since the observed area has been lined with a homogeneous colored material, all of the pixels should provide substantially identical RGB signal vectors. Therefore, the respective differences are based on color distortions or on a reduction in intensity as a result of the structural type. To compensate for this, correction factors are now selected for each signal channel of each individual pixel, which correction factors see to it that, in the course of recording the homogeneous colored material, all of the RGB signal vectors correspond to the RGB signal vector at the brightest location in the observed area.

Color distortions depend, in particular, greatly on the illumination conditions in the observed area. To prevent error sources based on a change of the illumination conditions, the illumination used during the experimental determination of the pixel-specific, signal channel-dependent correction factors of the illumination should therefore correspond to the illumination used during the subsequent employment of the camera system.

In many cases of the application of the method for matching the first electrical signal to the color perception of the human eye, the corrected RGB signal vectors, obtained by the correction of the RGB signal vectors originally made available by the color camera, are employed for controlling the separate signal channels of a color monitor. Here, the representation of the colors on the color monitor also creates the problem that the representational characteristics of most color monitors do not correspond to the color perception of the human eye. This is based, in particular, on the fact that the brightness behavior of the color monitor is, as a rule, not linear, so that the intensity of the light produced at the color monitor is a non-linear function of the electrical input signals arriving at the color monitor, in this case of the RGB signal vectors. This means that, in the case where the RGB signal vectors, which had been corrected to match the color perception of the human eye, are merely transmitted to the color monitor and are displayed there, without taking the non-linearity of the monitor's brightness behavior into consideration, undesired distortions in the color image can occur on the color monitor. In that case, a dependable qualitative evaluation of a material represented on the color monitor, in particular of a material with an identifying characteristic, is then objectively not possible.

To prevent such color distortions in connection with their representation on a color monitor, the coefficients of the corrected RGB signal vector, which had been used as a basis, can each be raised to a higher power by a factory $\gamma$. By this non-linear conversion of the coefficient of the corrected RGB signal vector, it is possible to compensate for the non-linearity of the brightness behavior of most color monitors. It is necessary, for most color monitors, to select a value in the range between 0.3 and 0.5, and in particular of approximately 0.45, for the factor $\gamma$.

In the method of testing the color image for a color deviation from the reference image, the processing of the stimulations, in connection with human color perception, is simulated. To reproduce the three cone types of the human eye, with their differing spectral sensitivity, a signal vector is made available by each pixel for the color image recorded by the color sensor, as already mentioned, whose coefficients preferably represent three signal channels that are separated from each other. Each one of the three signal channels has a characteristic spectral sensitivity. The two receptive fields representing the second stage of color processing in human vision, are simulated by an appropriate linkage of the three separate signal channels. The red/green field of human color perception represents the first compensation color channel in the technical model. The output signal of the first compensation color channel is generated by the linkage of the portion of the signal vector in the first signal channel with the portion of the signal vector in the second signal channel. Linkage takes place by a calculation prescription consisting of at least one arithmetic rule. The blue/yellow field is created in the technical model by the linkage of the portion of signal vector in the third signal channel with a combination of the portions of the signal vectors from the first and second signal channel. In the technical model, the blue/yellow field corresponds to the second compensation color channel. The output signal of the second compensation color channel is generated by the above-described linkage. Linkage takes place by the use of a second calculation prescription consisting of at least one arithmetic rule. To evaluate the signal vector of the tested pixel, a classification of the output signals of the two compensation color channels takes place in the next step. By this process, it is determined whether the signal vector of the tested pixel, and therefore in the end also of the color image, corresponds to a defined class, by which determination a good/bad classification can be made.

For the principle of the method of the present invention, it is of negligible importance in which spectral range the signal channels of the method operate, as long as they are signal channels of different spectral sensitivity. It is advantageous. if the signal channels correspond to the three basic colors of the RGB model, namely red, green and blue, because with this, use is made of a widely distributed color model. The spectral sensitivity of each signal channel is advantageously matched to the spectral sensitivity of the cone types in the retina of the human eye.

It is of secondary importance, in accordance with the principle of the present invention, in which way the two output signals of the compensation color channels are generated. One option lies in that an arithmetic rule of the first calculation prescription provides a weighted difference formation of the portion of the signal vector in the second signal channel from the portion of the signal in the first signal channel, and/or that an arithmetic rule of the second calculation prescription provides a weighted difference formation of the weighted sum of the parts of the first and second signal channel from the portion of the third signal channel.

Preferably, at least one signal, in at least one compensation color channel, is subjected to a transformation prescription after and/or prior to the linkage, and in particular is subjected to a non-linear transformation prescription. A transformation has the particular advantage that the digital character of electronically generated color images can be taken into consideration. By use of the transformation prescription, it is also possible to transform a signal from the color range into a range, in which the stimulation of the cones can be described. Preferably, the signals in both compensation color channels are subjected to a transformation.

Since the receptive fields in human vision are characterized by a low pass behavior, it is sensible to filter at least one signal in at least one compensation color channel by the use of a low pass filter. Preferably, the output signal of every compensation color channel is filtered by a low pass filter.

Preferably, the method in accordance with the present invention has a learning mode and a working mode. In particular, an evaluation device, which is processing the signals from the image sensors, can be switched between these two operating modes, i.e. between the learning mode and the working mode. During the learning mode, at least one reference image, such as, for example, the recording of at least a single printed sheet, is checked pixel by pixel, and the output signals from the two compensation color channels generated by the reference image are stored in a data memory as a second electrical signal constituting a reference variable. In actuality, this means that a signal vector of the reference image is made available, for example, in three signal channels, that the portions of the signal vector made available in each signal channel are matched with respect to perception, and that these portions are thereafter linked with each other corresponding to the compensation color model. Then the output signals from each compensation color channel are stored pixel by pixel in the data memory. In the subsequent working mode, the output signals of the respective pixel, created by a color image to be tested, are compared with the corresponding values stored in the data memory in the form of reference variables, and a classification decision is then made.

In order to take permissible color fluctuations of the color image, as well as fluctuations of the conditions during the taking of the image into consideration, it is practical for the values stored in the data memory to be formed by several reference data sets, so that a permissible tolerance window is fixed in the data memory for each value, within which permissible tolerance window an output signal value of a compensation color channel, generated during the image testing, is permitted to fluctuate. In this case, the reference variable of the output signal of a compensation color channel can be determined, for example, by arithmetic average value formation from the individual values, wherein the individual values result from the reference data sets. For example, the tolerance window can be determined by the minimum and maximum values of, or by the standard deviation from, the output signals generated by the tested reference images of the compensation color channel of each pixel.

The method for checking the identifying characteristic, regarding its affiliation with a defined class of identifying characteristics, preferably proceeds through the following substantial method steps: characteristics formation, fuzzyfication, interference, de-fuzyfication and decision regarding a class affiliation.

During the characteristics formation, the first electrical signal made available by the image sensor is converted, by the use of at least one calculation prescription, into a translation-invariant signal within a range of characteristics. The aim of the characteristics formation is the determination of those values by the use of which typical signal properties of the color image are characterized. The typical signal properties of the color image are represented by so-called characteristics. In this case, the characteristics can be represented by values within the characteristic range, or by linguistic variables. A signal is created by the conversion of the first electrical signal in the characteristic range, which signal consists of one characteristic value or of several characteristic values.

The affiliation of a characteristic value with a characteristic is described by at least one fuzzy affiliation function. This is a soft, or is a fuzzy association wherein, as a function of the value of the characteristic value, the affiliation of the characteristic value with the characteristic exists within a standard interval between 0 and 1. The concept of affiliation leads to a characteristic value no longer being either wholly affiliated, or not at all affiliated with a characteristic. Instead, it can take on a fuzzy affiliation which lies between the Boolean logical values 1 and 0. The above-described step is called fuzzyfication. Thus, during fuzzyfication, a conversion of a hard characteristic value into one or into several fuzzy affiliations substantially takes place.

In the course of interference, a higher level affiliation function is generated by a calculation prescription consisting at least of one rule, wherein all affiliation functions are linked together. As a result, a higher order affiliation function is obtained for each window.

In the course of de-fuzzyfication, a numerical value is determined from the higher order affiliation function formed from the interference, which numerical value is also called a sympathetic value. During the decision regarding the class affiliation, a comparison of the sympathetic value with a previously fixed threshold value takes place, by which comparison, the affiliation of the window to a specified class is decided. In this case, the threshold value forms a further reference variable which is contained in the second electrical signal.

It is of secondary importance, for the basic progression of the method in accordance with the present invention, of which type the characteristic values in the characteristic range are. For example, in the case of time signals, it is possible to determine their mean value or their variation as the characteristic values. If the requirement is made of the method for checking the identifying characteristic, for its affiliation to a defined class of identifying characteristics, that it is to process the color images free of errors, regardless of the respectively prevailing signal intensity, and if furthermore small, but permissible fluctuations in the color image are not to result in interferences, it is sensible to perform the conversion of the first electrical signal from the two-dimensional local range by the use of a two-dimensional spectral transformation. Examples of a suitable spectral transformation are respectively two-dimensional Fourier, Walsh, Hadamard or circular transformations. Translation-invariable characteristic values are obtained by the use of the two-dimensional spectral transformation. The value of the spectral coefficients, obtained by use of a spectral transformation, is preferably used as characteristic value.

The affiliation functions are preferably unimodal potential functions. The higher order affiliation function is preferably a multi-modal potential function.

It is advantageous to parametrize at least one affiliation function. If the affiliation function has positive and negative slopes, it is advantageous if the parameters of the positive and negative slopes can be separately determined. A better matching of the parameters with the data sets to be examined is assured by this paramiterization.

In accordance with a particularly preferred embodiment of the present invention, the method is again divided into two different modes of operation, namely into a learning mode and into a working mode. If the affiliation functions are parametrized, it is possible, in the learning mode, to determine the parameters of the affiliation function from measured data sets. In the learning mode, the parameters of the affiliation functions are matched with so-called reference images, so that in the learning mode, an affiliation of the characteristic values resulting from the reference images with the corresponding characteristics is derived by the use of the affiliation function and its parameters. In the subsequent working mode, the characteristic values resulting from the subsequently measured data sets are weighted with the affiliation functions whose parameters had been determined in the learning mode, by the use of which, an affiliation of the characteristic values of the now measured data sets with the corresponding characteristics is established. Thus, the parameters of the affiliation functions are determined by the use of measured reference data sets because of the division of the method into a learning mode and a working mode. The data sets to be tested are weighted in the working mode by the affiliation functions which were determined in the learning mode and are evaluated.

Furthermore, a rule by which the affiliation functions are linked with each other preferably is a conjunctive rule within the meaning of an IF . . . THEN linkage.

The generation of the higher order fuzzy affiliation functions is preferably divided into the following partial steps: premise evaluation, activation and aggregation. In the premise evaluation, an affiliation value is determined for each IF portion of a rule, and during activation, an affiliation function is determined for each If . . . THEN rule. Thereafter, during aggregation, the higher order affiliation function is generated by overlaying all of the affiliation functions created during activation.

It is advantageous to perform the sympathetic value determination in accordance with a focus and/or a maximum method.

Checking the identifying characteristic for a defined geometric contour and/or for a relative arrangement, with respect to at least one further identifying characteristic of the material, is based on the basic idea of additionally letting known information regarding this identifying characteristic enter into the evaluation in the course of evaluating a positionally variable identifying characteristic, for which the optical properties, for example the reflection capability, does not suffice for a sufficiently dependable identification. A premise in this case is that the positionally variable identifying characteristic, such as, for example, a colored window thread, differs in its optical properties, for example in its gray value, at least in partial areas, sufficiently from the remaining material to be inspected, such as, for example, the print image surrounding the identifying characteristic, so that there is at least no complete correspondence between the identifying characteristic and the print image. Thus, for determining the position of the positionally variable identifying characteristic, additional information regarding the contour, which is known per se, of the identifying characteristic or the relative arrangement of several identifying characteristics contained in the print image are evaluated. This additional information is then stored in a mask reference which is stored in the data memory in regard to every material to be evaluated, which represents the geometric data in a suitable form.

Furthermore, a background reference variable has been stored as a reference in the data memory, which background reference variable represents the optical properties of the print image in at least a part of an area surrounding the identifying characteristic. The optical properties of the background reference variable must differ, at least slightly, from the optical properties of the identifying characteristic to be detected. In the course of testing the material, a differential value, which represents a differential image at least of the expected area, is then formed from the actual first electrical signal made available by the image sensor and the background reference variable.

Substantially all of the characteristics of the print image, which correspond in their optical properties to the background reference variable, are blanked out of the differential image by the use of the difference formation. Only positionally variable areas of the identifying characteristic and also of other elements, such as printing errors or deviations of the edges, are represented in the differential image because of their deviation from the background reference value, wherein the areas of the positionally variable identifying characteristic have particularly high amplitudes.

As soon as the differential values are available, these differential values are compared with the mask reference variables of the mask reference, and a conclusion regarding the actual position of the identifying characteristic is drawn from the result of the comparison. This method step is based on the reflection that the differential image is substantially determined by the representation of the positionally variable identifying characteristic, so that a conclusion regarding the actual position of the positionally variable identifying characteristic can be drawn from the considerable overlapping of the mask reference and the differential image. If no sufficient overlap between mask reference variables and differential values can be determined, because of other error effects, this is harmless, since this merely leads to an error indication in the course of the print image check, for example, and to the removal of the respective printed sheet.

Preferably, the areas of the print image, resulting from the actual position of the identifying characteristic, are blanked out during the subsequent qualitative evaluation of the material, so that interferences with the checking of the print image, because of the positionally variable arrangement of the identifying characteristic, are excluded.

The detection of the positionally variable identifying characteristic can be improved during the performance of this method in that a threshold for binary formation is stored in the data memory. After the differential image has been formed from the first electrical signal and the background reference variable, all image data, whose values lie below the threshold for binary formation, can be filtered out of the differential image. This means that only those image points remain in the differential image which differ with considerable significance from the remaining print image, so that the mostly other deviations, for example printing errors or edge deviations, can be blanked out of the differential image.

The procedure, in the course of determining the position of the positionally variable identifying characteristic in the actual print image, can be such that the mask reference is shifted until a maximum overlap between the mask reference and the differential image results. Various mathematical evaluation methods can be employed for this, for evaluating the overlap between the mask reference and the differential image and for finding the appropriate overlap maximum. It is, of course, possible to provide the evaluation of the overlap by a visual check performed by sufficiently trained checking personnel which, however, because of the high costs of personnel and the low processing speed, is not sufficiently economical in most cases. Therefore, the calculation of the overlap between the differential image and the mask reference should take place by using suitable mathematical operations by the use of methods of electronic data processing, if possible.

A possibility for evaluating the overlap between the mask reference and the differential image consists in the calculation of foci in accordance with the optical distribution of the image points in the differential image, and in comparing these foci with the focus of the mask reference. Maximum overlap results when the sum of the focus differences between the mask reference and the differential image is minimized.

A prerequisite for performing this method for testing the identifying characteristic for a defined geometric contour and/or for testing a relative arrangement, with respect to at least one further identifying characteristic of the material, is the storage of a suitable background reference variable in the data memory. In principle, the background reference variable can be simply preset as a method parameter, such as, for example, a parameter based on one, or on several empirical values. However, it is advantageous if the background reference variable is specifically fixed in a learning mode as a function of the respective print image of the material to be tested. Two alternatives of this will be discussed in what follows.

In accordance with a first alternative for determining the background reference variable, reference material, which does not contain the positionally variable identifying characteristic, is used in the learning mode. For example, printed sheets imprinted with bills or stamps can be used for this, which printed sheets do not have the window thread. By evaluating this reference material without the identifying characteristic it is possible to derive the background reference variable.

If reference material, without an identifying characteristic, is not available, the learning mode can also be performed using reference material containing the positionally variable identifying characteristic. If, in the course of evaluating the print image of the reference material, the positionally variable identifying characteristics appear bright, in comparison with the surrounding area, a threshold value, corresponding to the values of the darkest image points of the identifying characteristic, is selected as the background reference variable. In the course of subsequent testing of the material, it is then assumed, based on the threshold value, that, at least in the expected area, all image points which are darker than the background reference variable are not a part of the positionally variable identifying characteristic. But, if in comparison with the surrounding area, the identifying characteristic appears dark, a threshold value is selected as the background reference variable whose value corresponds to the brightest image points of the identifying characteristic.

To the extent that it is required on the basis of the optical properties of the print image, it is, of course, possible to define different background reference variables for different areas of the material, so that the positionally variable identifying characteristic is pictured with sufficient significance in the differential image.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENT

Figure 1:
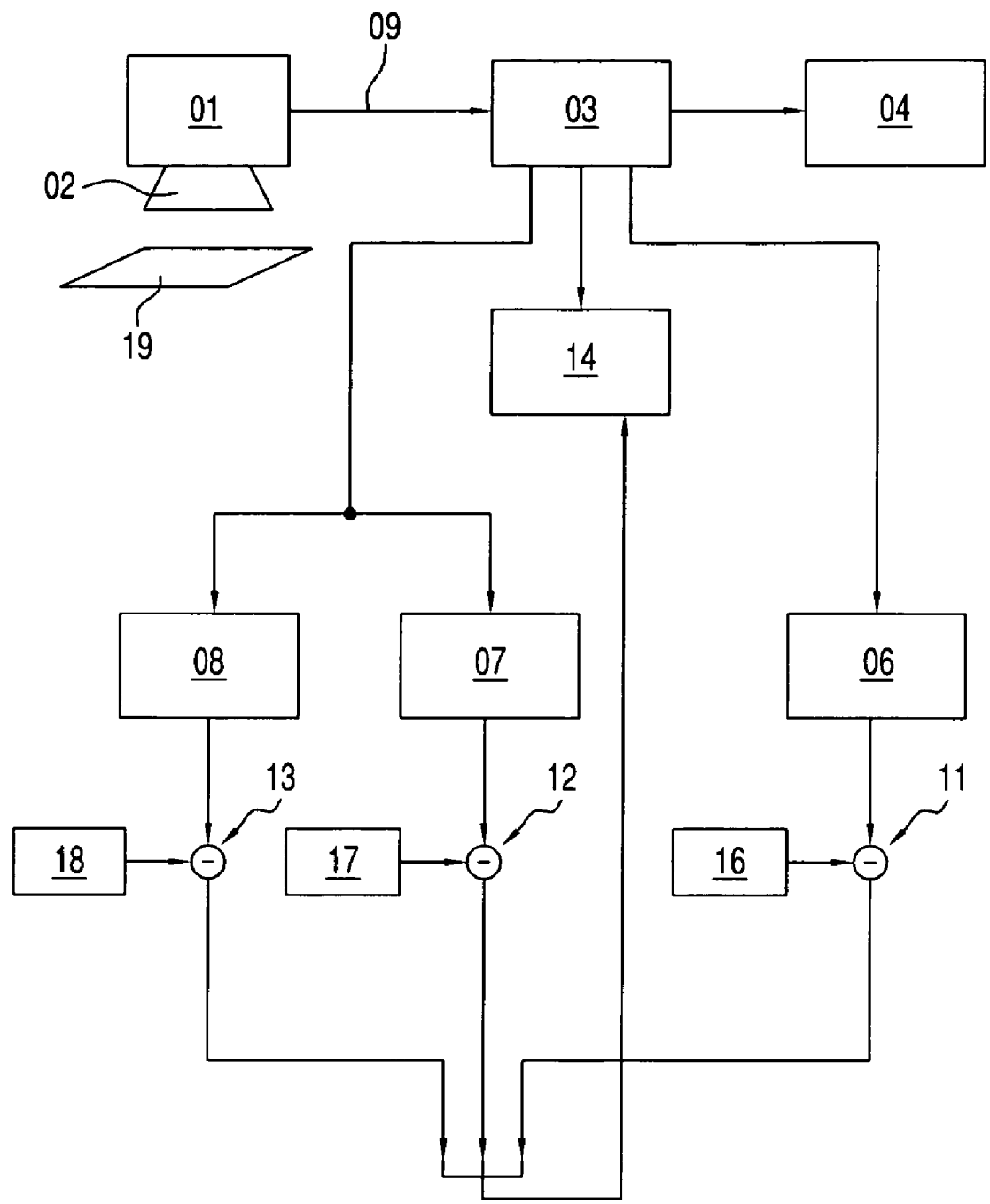
FIG. 1, a block diagram with functional units which are relevant to the method in accordance with the present invention, in FIG. 2, method steps in the course of performing the method for testing the color image for a color deviation from a reference image in accordance with the present invention, in FIG. 3, a schematic representation of the method for testing for color deviations in the recorded color image with a compensation color model, in FIG. 4, a flow chart of the learning and working mode, as well as of the classification, in FIG. 5, a flow diagram of the method for testing the identifying characteristic for its affiliation with a defined class of identifying characteristics, in FIG. 6, a top plan view of a schematically represented differential image, in FIG. 7, a differential image in accordance with FIG. 6 following the performance of a binary formation, in FIG. 8, a mask reference for determining the position of the positionally variable identifying characteristic in the differential image in accordance with FIG. 7, in FIG. 9, the overlap between the differential image in accordance with FIG. 7 and the mask reference in accordance with FIG. 8, in FIG. 10, a second mask reference in a schematically represented side elevation view, and in FIG. 11, a second differential image in a schematically represented side elevation view.
Figure 4:
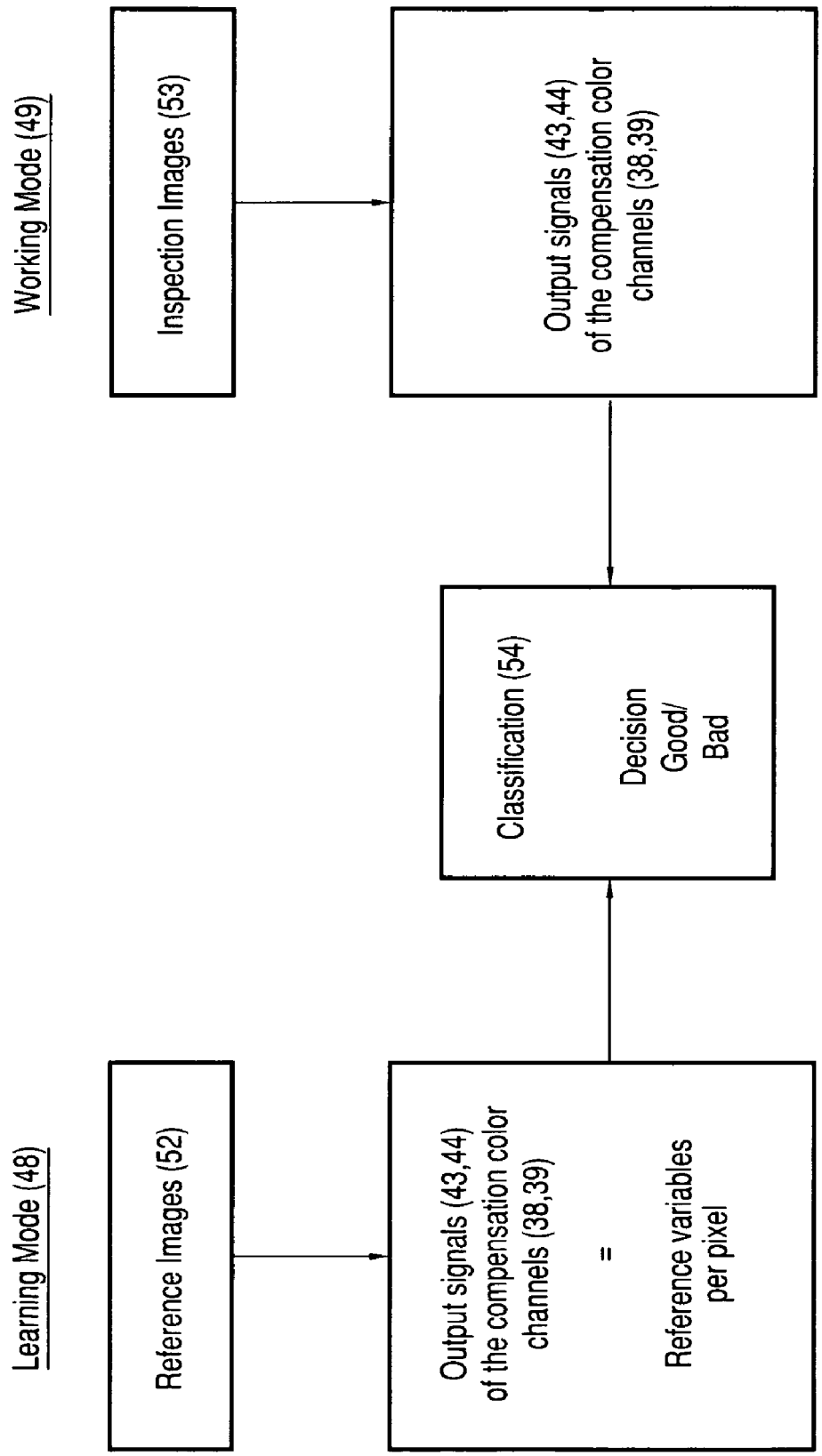

A block diagram with the functional units relevant for the performance of a method for the qualitative evaluation of an imprinted material 19 with at least one identifying characteristic, in accordance with the present invention, is shown in FIG. 1. A color camera 01, which, for example, has been attached fixed in place, either in, or at a printing press, is positioned so that with its image sensor 02 it can record color images of a material 19 to be evaluated. The material 19 is moved past the color camera 01, preferably in the course of a running print process, which color camera 01 is connected to an evaluating device 03. The image data recorded by the color camera 01 and evaluated in the evaluating device 03 can be represented, if required, on a color monitor 04. The color monitor 04 can be arranged in or at a control console, which is part of the printing press. The testing methods which, in accordance with the present invention, are used for the qualitative evaluation of the imprinted material 19, are represented in connection with the evaluating device 03 in, for example, three parallel signal paths. The testing processes in the respective signals paths preferably take place in the same evaluating device independently of each other. The tests preferably occur at least approximately at the same time. Typically, the test processes at least start at the same time. The test process can start after the evaluating device 03, which operates in at least two modes of operation, has changed from its learning mode 48 into its working mode 49, as depicted in FIG. 04. One signal path relates to a first functional unit 06 for testing at least the color image of the identifying characteristic for a color deviation from the reference image. A second signal path relates to a second functional unit 07 for testing the identifying characteristic for its affiliation with a defined class of identifying characteristics. A third signal path relates to a third functional unit 08 for testing the identifying characteristic for a defined geometric contour or for an arrangement relative to at least one further identifying characteristic of the material 19. Each test includes a comparison, performed at a comparison location 11, 12, 13, of the first signal 09, which has been made available by the image sensor 02 of the color camera 01 and which has been suitably processed, with a suitably fixed reference variable 16, 17, 18, respectively. The reference variables 16, 17, 18 are stored in a data memory 14, which is part of the evaluating device 03. The respective test results present in the individual signal paths are again reported to the evaluating device 03 for the purpose of being stored there. The functional units, which are relevant to the method for the qualitative evaluation of an imprinted material 19 with at least one identifying characteristic, can also be implemented in a machine which is processing the material 19. This machine can preferably be arranged downstream of, but can also be located upstream of, for example a printing press, preferably a sheet-fed printing press, and in particular a sheet-fed rotary printing press. The material 19, such as a printed sheet 19 having, for example, several identifying characteristics, is imprinted in a printing press at a speed of, for example, 18,000 sheets per hour and/or is subsequently further processed in the machine processing these printed sheets 19 at this speed. In the situation where the material 19 being evaluated is embodied as a web 19 of material, the printing speed or the further processing speed of the web 19 can be 15 m/s, for example. Although the testing processes for evaluating the quality of the material 19 to be processed by the printing press or by the machine are calculation-intensive, and the movement speed of the material 19 is high, a dependable evaluation is achieved by the use of the method in accordance with the present invention. Since the functional units, which are relevant to the method for the qualitative evaluation of an imprinted material 19 with at least one identifying characteristic, are arranged in or at the printing press or the machine processing the material 19, the location for making the reference signal available and the location of the test are identical. The color image and its reference image can be recorded by the same functional units, and in particular can be recorded by the same color camera 01, in the same location, and can be evaluated in the same evaluating device 03.

The following method steps are performed for the qualitative evaluation of the imprinted material 19 and will now be explained by way of example by referring to FIGS. 2 to 11.

Figure 2:
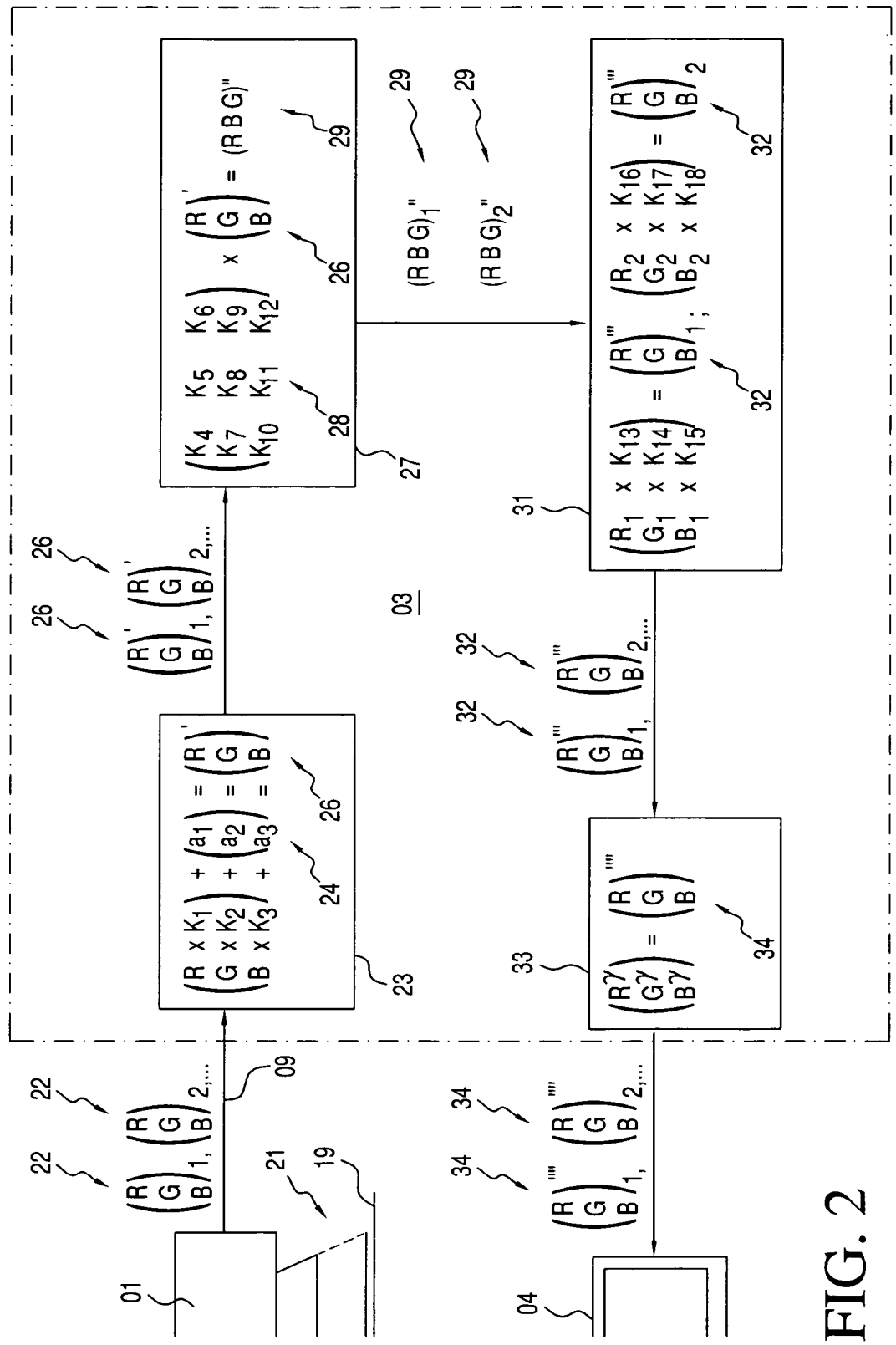
Figure 3:
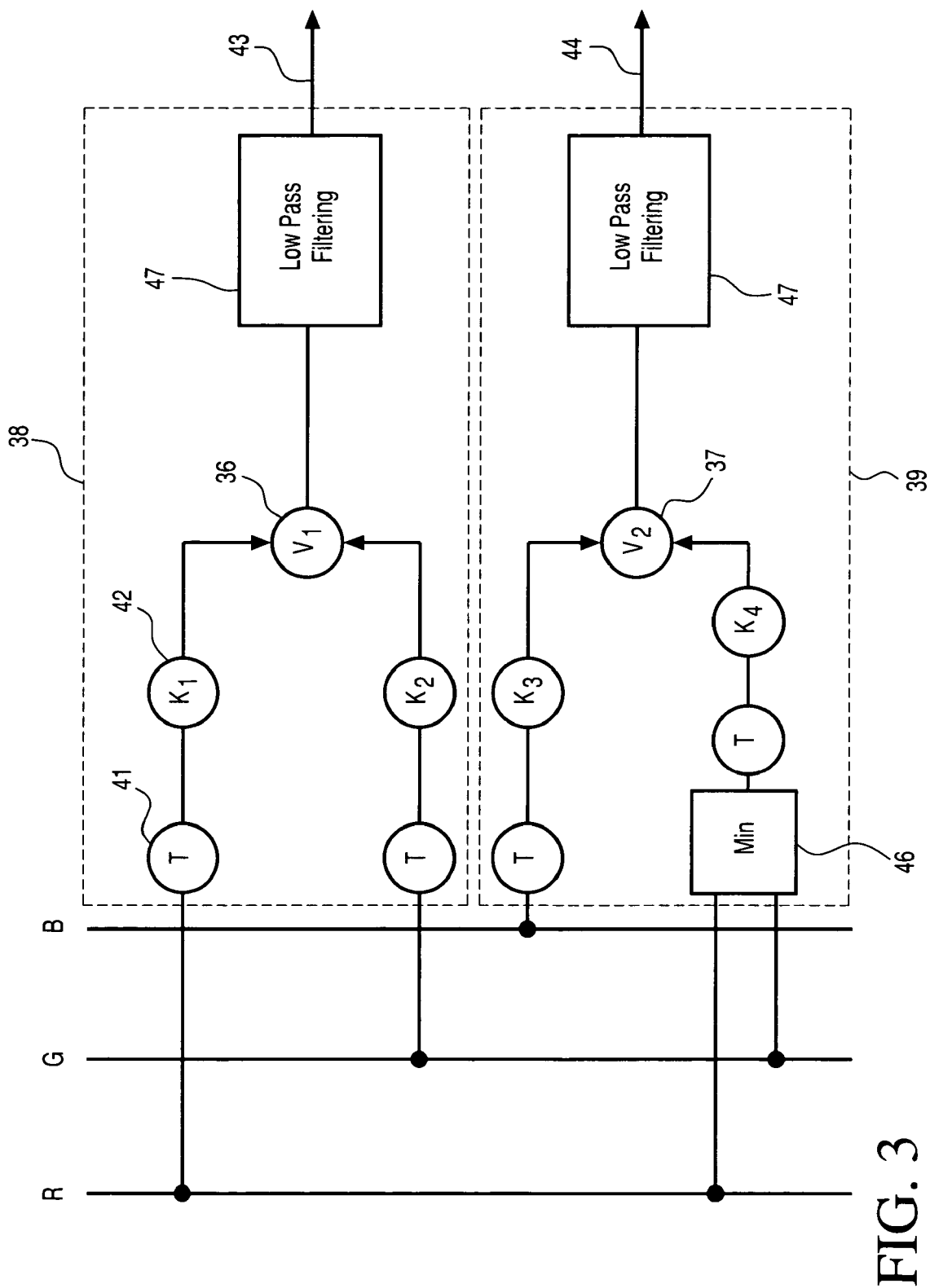

A color image of a material 19, which has been imprinted in color and which is arranged in an observation area 21, as seen in FIG. 2, is recorded by the color camera 01. The color camera 01 has an image sensor 02, which is preferably embodied as a CCD chip 02, and which converts the image information recorded in the observation area 21 into electronic image data, which electronic image data form a first electrical signal 09 that is made available by the color camera 01, or by its image sensor 02. In the course of this conversion, a signal vector 22 is generated by each one of the light-sensitive pixels of the CCD chip 02. The color camera 01 makes available a number of signal vectors 22 corresponding to the number of pixels of the CCD chip, and identified by counting index, to the evaluating device 03 for further processing.

Preferably, each signal vector 22 has three coefficients R, G and B. The coefficients R, G and B correspond to the color values of the three signal channels red, green and blue. The vectorially first electrical signal 09 emitted by a pixel is correlated with the recorded color of the imprinted material 19 at the corresponding position in the observation area 21.

The signal vectors 22, whose counting indices are used for describing the arrangement of the respective pixels on the CCD chip 02, constitute raw data for a first correction module 23 for matching the color balance, the brightness and the contrast. For this purpose, each coefficient R, G, B of the signal vector 22 is multiplied by a signal-dependent correction factor $K_1$, $K_2$, $K_3$. Moreover, to the resulting vector is added a correction vector 24 with the fixed value coefficients $a_1$, $a_2$ and $a_3$. First corrected signal vectors 26 are created by this arithmetic operation, which arithmetic operation improves the color balance, the brightness and the contrast of the image data. This goal is achieved because the signal channel-dependent correction factors $K_1$, $K_2$, $K_3$, as well as the coefficients $a_1$, $a_2$ and $a_3$ of the correction vector 24 have been selected in such a way that, in the course of recording the reference gray values black and white, the signal vectors 22 generated by the color camera 01 are transformed in such a way that the received corrected signal vectors 26 correspond to those reference variables which result as the vectors from the conversion of the known CIELAB color values.

Thereafter, the first corrected signal vectors 26 are provided to a second correction module 27. In the second correction module 27, each first corrected signal vector 26 is multiplied by a quadratic ixi correction matrix 28, wherein i corresponds to the number of coefficients of the corrected signal vector 26, wherein in this case i=3. The second corrected signal vectors 29 result from this multiplication. The coefficients $K_4$ to $K_{12}$ of the quadratic correction matrix 28 had previously been determined in a suitable iteration process in such a way that the image information contained in the first corrected signal vectors 26 is brought closer to the color perception of the human eye.

Subsequently, the second corrected signal vectors 29 are forwarded to a third correction module 31. In the third correction module 31, signal channel-dependent correction factors relating to each pixel have been stored in a data memory 14 which, for accommodating the intensity values which depend from the position of the respective pixels, are multiplied with the coefficients R, G and B. As a result, the second corrected signal vectors 29 of the first pixel are multiplied by the correction factors $K_{13}$, $K_{14}$ and $K_{15}$ in order to calculate a third corrected signal vector 32 for the first pixel. Preferably, this correction of the second corrected signal vectors 29 is performed for all of the pixels of the image sensor 02.

The third corrected signal vectors 32 are then passed on to a fourth correction module 33. In the fourth correction module 33, the coefficients R, G. B of the third corrected signal vectors 32 are raised to a higher power by a factor γ and the fourth corrected signal vectors 34 are calculated from this. By raising the third corrected signal vectors 32 by the factor γ, the non-linear brightness transfer function of a color monitor 04 is taken into consideration, to which the fourth corrected signal vectors 34 are transmitted for display.

As previously mentioned, the recording of the image signal by an image sensor 02 takes place in signal channels R, G, B which are separated from each other. In the present preferred embodiment, the three signal channels R, G, B are the three signal channels red R, green G and blue B. Each one of the signal channels R, G, B has an adjustable spectral sensitivity. This has the advantage that the spectral sensitivity of each signal channel R, G, B can be adapted to the spectral sensitivity of the respective cone of the retina of the human eye.

In the course of utilizing the method for checking the color image for a color deviation from a reference image, the spectral contents of an image is analyzed pixel by pixel. To model the two receptive fields red/green and blue/yellow of the human eye, in accordance with FIG. 3 in this method the image sensor signals of the signal channels R, G, B are linked with each other. Prior to the actual linkage by the use of the calculation prescriptions 36, 37, each image sensor signal is subjected to a non-linear transformation 41 in the compensation color channels 38, 39. Because of this, the digital character of the electronically created recordings is taken into consideration. Each signal is subsequently weighted with a coefficient $K_i$ 42 (i=1 . . . 4). It is achieved by this process that a mere intensity change of the initial image does not make a contribution to one of the output signals 43, 44 of the compensation color channels 38, 39. The generation of the output signals 43, 44 of the compensation color channels 38, 39 takes place analogously to the generation of the signals of the receptive fields in the human retina. This means that a linkage of the signal channels R, B, G, by use of the calculation prescriptions 36, 37, is performed in a manner corresponding to the linkage of the cones of the human retina. For forming the output signal 43 of the red/green compensation color channel 38, the image sensor signals of the red signal channel R and the green signal channel G are linked together by the use of the first calculation prescription 36. For generating the output signal 44 of the blue/yellow compensation color channel 39, in the present preferred embodiment, the image sensor signal of the blue signal channel B is linked with the minimum 46 of the image sensor signals of the red signal channel R and the green signal channel G by use of the calculation prescription 37. The receptive fields of the human retina are distinguished by a low pass behavior. Accordingly, in the present preferred embodiment, the signals obtained by linkage are subjected to low pass filtering 47, for example by the use of a Gauss low pass filter.

FIG. 4 shows the actual testing of the imprinted material 19, which takes place in two stages, namely in a learning mode 48 and in a subsequent working mode 49. The aim of the learning mode 48 is the generation, pixel by pixel, of reference variables for use as reference data values, which reference data values are compared in the subsequent working mode 49 with the output signals 43, 44 of the compensation color channels 38, 39 of the corresponding pixels. In the learning mode 48, the image contents of a reference image 52, or of several reference images 52, are analyzed in that the image contents of each pixel are introduced into three signal channels R, G, B, and a subsequent matching, in accordance with the perception of the image signals of each signal channel R, G, B, is performed. Thereafter further processing of the image sensor signals is performed, in accordance with the previously described compensation color method. The output signals 43, 44 of the compensation color channels 38, 39, which are obtained for each pixel, are then stored in a data memory 14. In order to also take permissible fluctuations of the reference images 52 into consideration, it is useful if several reference images 52 are considered in the learning mode 48. It is possible, because of this, for the stored reference variables of each pixel to have a permissible fluctuation tolerance. The fluctuation tolerance can be fixed either by minimum/maximum values or by the standard deviation from the received data of the image contents of the reference images 52 of each pixel.

Then, in the working mode 49, a pixel by pixel comparison of the output values 43, 44 of the compensation color channels 38, 39 of an inspection image 53, with the reference variables from the data memory 14, takes place. This comparison can be performed by the use of a linear or of a non-linear classification device 54, and in particular by the use of threshold value classification devices, Euclidic distance classification devices, Bayes classification devices, fuzzy classification devices, or artificial neuronal networks. A good/bad decision subsequently takes place.

Figure 5:
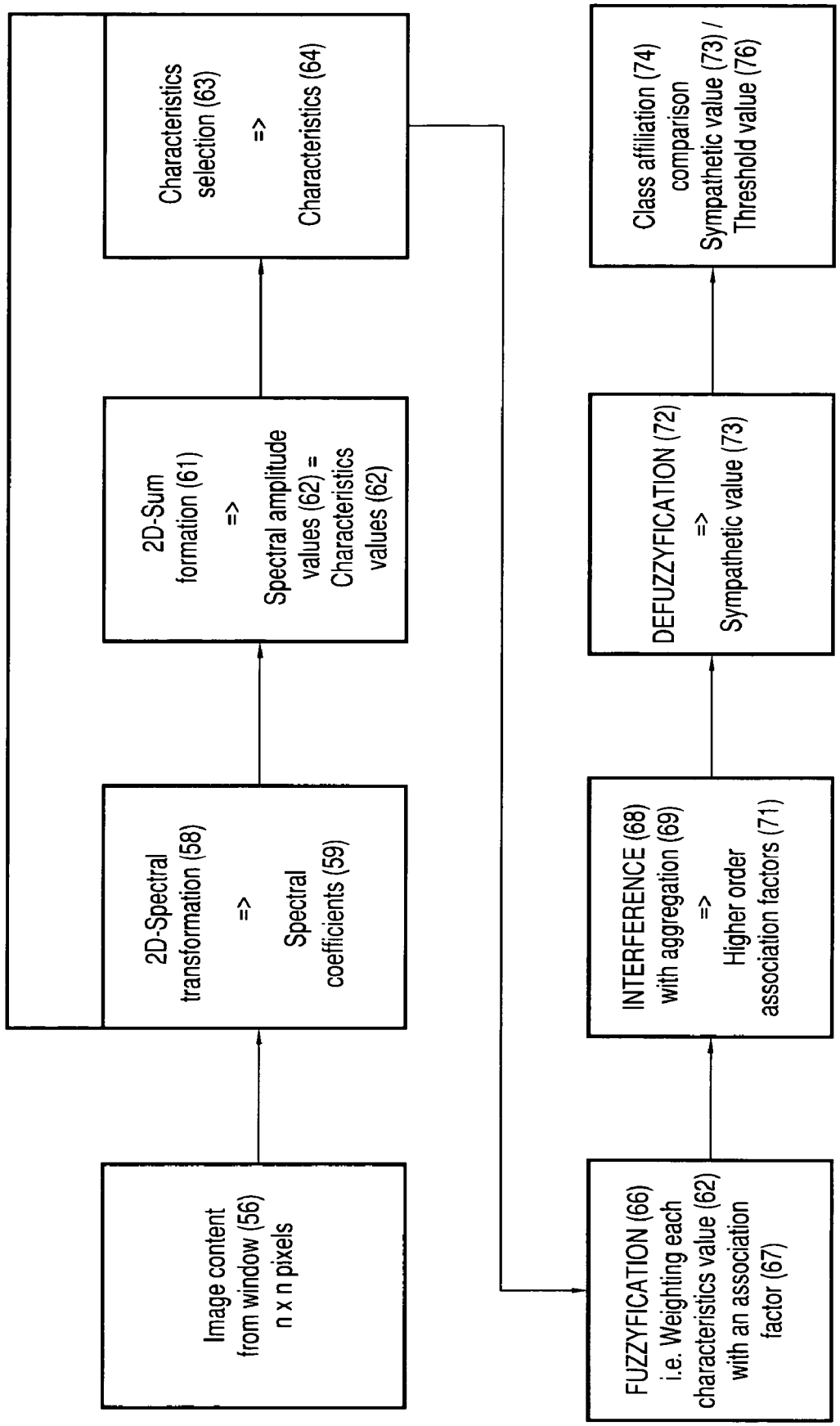

FIG. 5 shows a flow diagram of the signal evaluation, in the method for checking the identifying characteristic for its association with a defined class of identifying characteristics, in accordance with the present invention.

First, a grid of M×N windows 56 is placed over the entire color image to be checked, wherein M, N>1. Each window 56 advantageously consists of m×n pixels, with m, n>1. A square window 56 of N×N windows 56 is preferably selected, wherein each window 56 consists of n×n pixels. In the testing process, the signal of each window 56 is checked separately.

The two-dimensional color image of the local range is transformed, by use of one or of several two-dimensional spectral transformations 58, into a two-dimensional image in the frequency range. The obtained spectrum is called a frequency spectrum. Since, in the present preferred embodiment, this is a discrete spectrum, the frequency spectrum is also discrete. The frequency spectrum is constituted by the spectral coefficients 59, which are also called spectral values 59.

The sum formation 61 of the spectral values 59 takes place in the next method step. The sum of the spectral values 59 is called a spectral amplitude value 62. In the present preferred embodiment, the spectral amplitude values 62 constitute the characteristics values 62, i.e. they are identical to the characteristics values 62.

The characteristics selection 63 follows as a further method step. It is the goal of the characteristics selection 63 to select those characteristics 64 which are characteristic of the image content of the color image to be checked. Characteristic spectral amplitude values 62, which define the characteristic 64 by their position in the frequency range and by their amplitude, as well as linguistic variables, such as "gray", "black" or "white", for example, are possible as characteristics 64.

In the following method step, the fuzzyfication 66, the association of each spectral amplitude value 62 to a characteristic 64 is determined by a soft or by fuzzy association function 67. In other words, weighting is performed.

If, in a learning mode, the association functions 67 are to be matched to reference variables, which are stored in the form of reference data sets, it is useful for the association function 67 to be configured as parametrized monomodal, or as one-dimensional potential functions, in which the parameters of the positive and negative slopes can be separately matched to the reference variables to be tested. In the working mode, following the learning mode, the data sets of the image contents, from which the characteristics values 62 of the color images to be checked result, are weighted with the respective association functions 67, whose parameters had been determined in the previous learning mode. This means that for each characteristic 64 a sort of SHOULD BE—IS comparison takes place between a reference data set, expressed in the parameters of the association functions 67, and the data set of the color image to be checked. A soft or a fuzzy association is produced between the respective characteristics value 62 and the characteristic 64 by the association functions 67.

In the next method step, the interference 68, a substantial conjunctive linkage 69, also called an aggregation 69, of all of the association functions 67 of the characteristics 64 takes place, by the use of which, a higher order association function 71 is created.

The next method step, defuzzyfication 72, determines a concrete association value 73, or a sympathetic value 73, from the higher order association function 71. In the course of the classification 74, this sympathetic value 73 is compared with a previously set threshold value 76, so that a classification statement can be made. The threshold value 76 is set either manually or automatically. Setting of the threshold value 76 also takes place in the learning mode.

The method for checking the identifying characteristic, for a defined geometric contour and/or for a relative association with at least one further identifying characteristic of the material, substantially takes place during the following steps.

Figure 6:
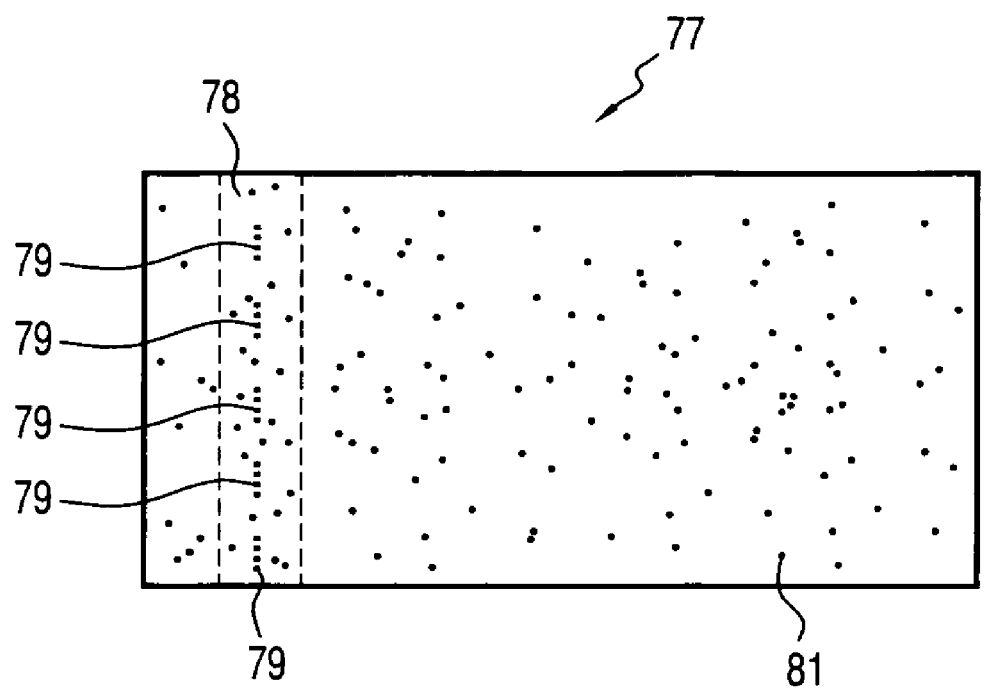
Figure 8:
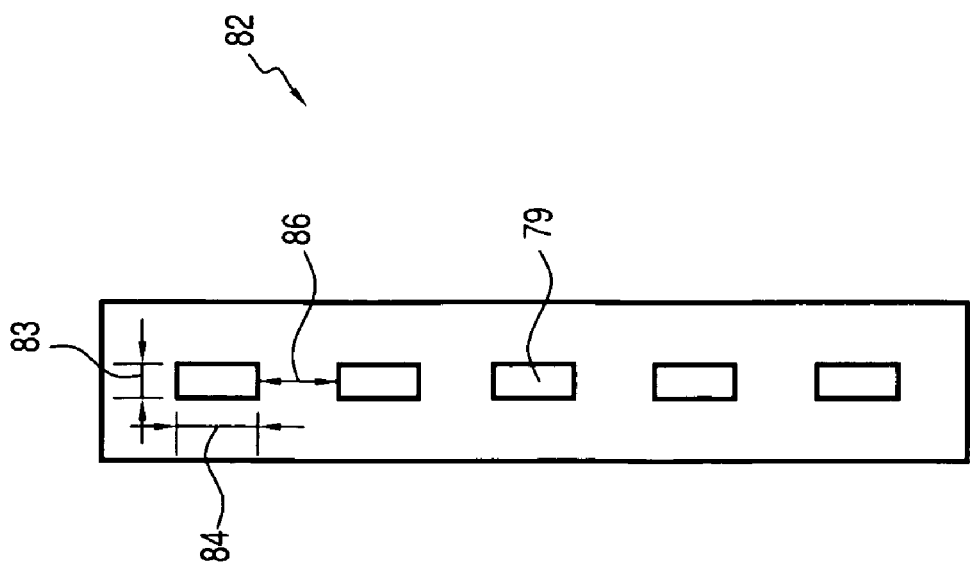

In accordance with FIG. 6, a differential image 77 had been formed, in the course of printing sheets, which are, for example, imprinted with bills 19, wherein only a portion of the differential image 77, in the area of a bill 19, is represented in FIG. 8. It can be seen, as depicted in FIG. 6, that the normal print image of the bill 19 has been blanked out of the differential image 77. Only those areas of the print image, which significantly differ from the background reference value, are represented as dark fields in the differential image 77. In a strip-shaped expected range 78, which is indicated by dashed lines, the position of, for example, an identifying characteristic 79 placed into the printed sheet can vary, which identifying characteristic can be, in particular, an incorporated window thread 79 which, in accordance with its perforations, is shown in five dark fields 79.

Besides the five dark fields 79 which can be seen in the representation of the window thread 79, further perforation characteristics are formed in the differential image 77 as irrelevant dark fields 81 which had been created by print errors 81, for example.

Figure 7:
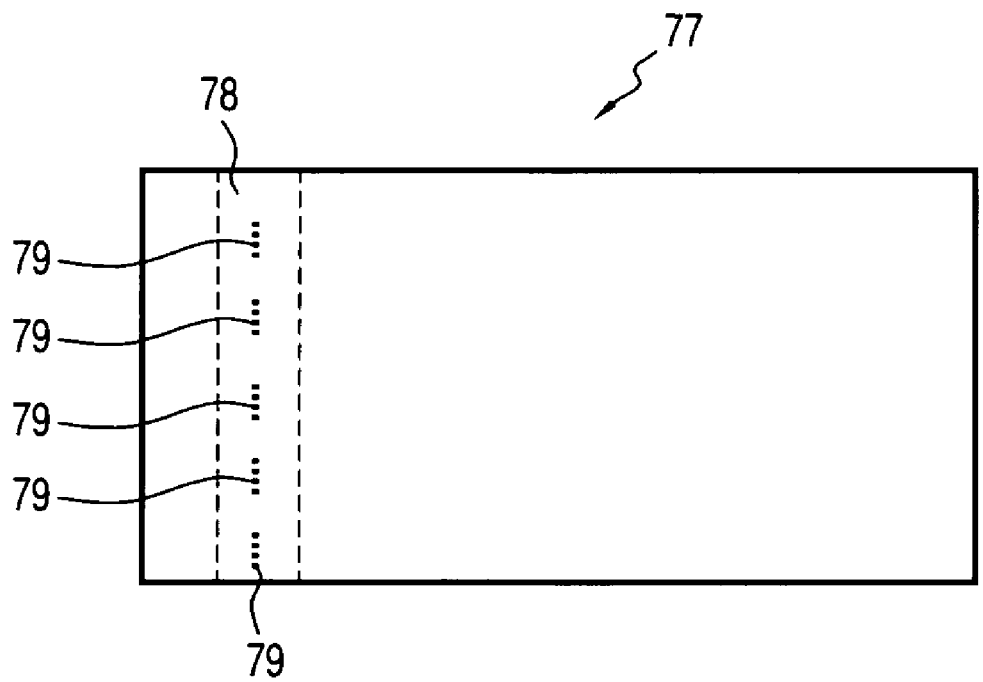

FIG. 7 shows the differential image 77 following a suitable binary formation, by the use of which, the irrelevant dark fields 81 were filtered out. As a result, only the dark fields 79 stemming from the window thread 79 stand out significantly in the differential image 77.

FIG. 8 represents a mask reference 82 in its geometric shape. The data for the width 83 and the length 84 of the window thread perforations 79 have been stored in the mask reference 82. Furthermore, values of the distance 86 between the window thread perforations 79, and the number of window thread perforations 79 per bill 19, are stored in the mask reference 82.

Figure 9:
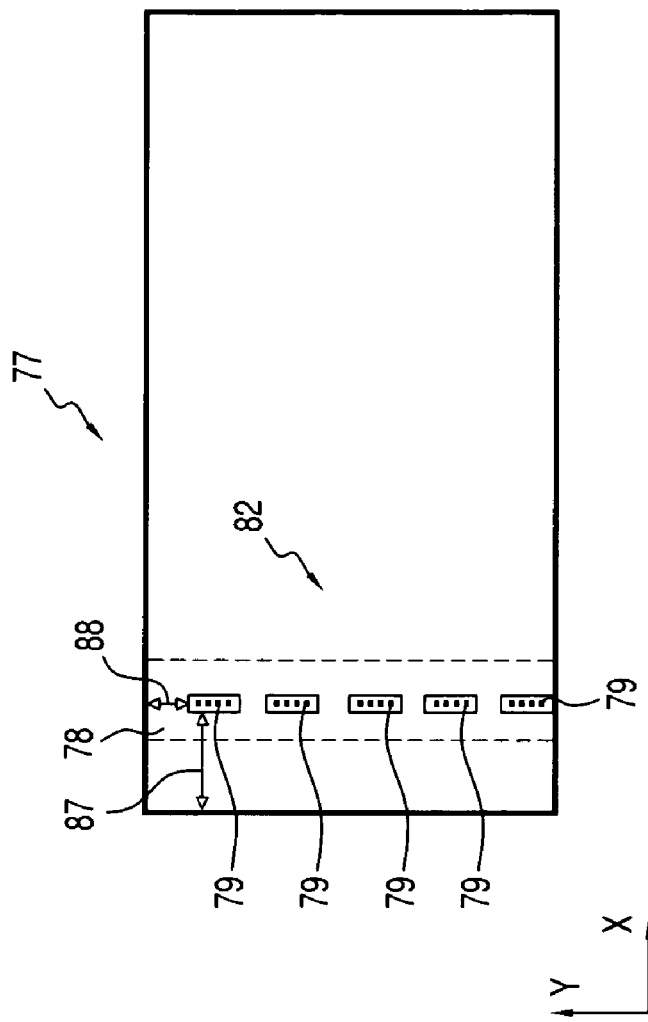

As is schematically indicated in FIG. 9, during the evaluation the mask reference 82 is shifted, by the use of technical data operations, in relation to the differential image 77, until a maximum overlap between the mask reference 82 and the dark fields 79 in the differential image 77 results. Once this maximum overlap has been achieved, it is possible to draw conclusions regarding the actual position of the window thread 79 in the print image from the distances 87, 88 which, for example, result from the actual positions in the X and Y directions of the mask reference 82, in relation to the edges of the bill 19, so that during a subsequent check of the print image, the areas of the window thread perforations 79 can be blanked out.

Figure 10:
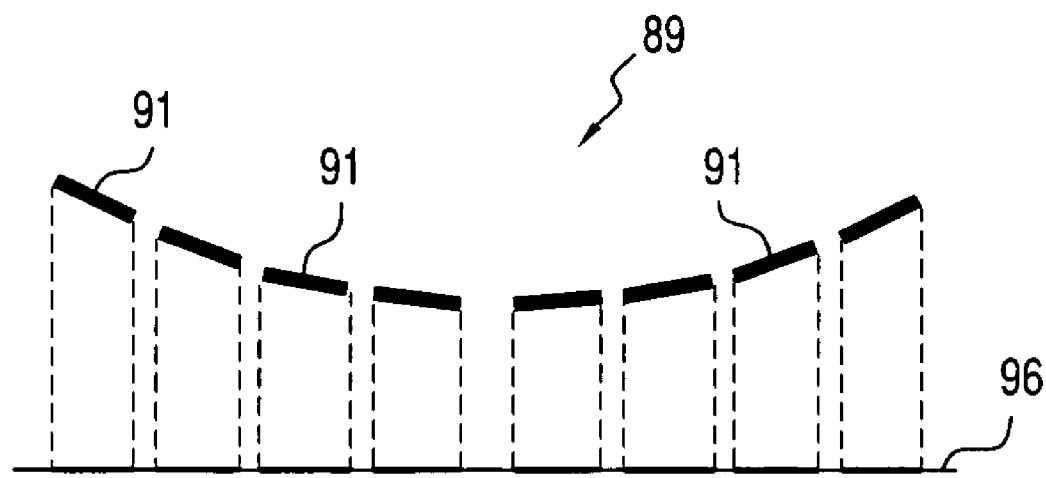

FIG. 10 shows a second mask reference 89, which represents dark fields 91 corresponding to eight window thread perforations 91 in the course of the check of a bill 19 on a concavely curved support surface.

Figure 11:
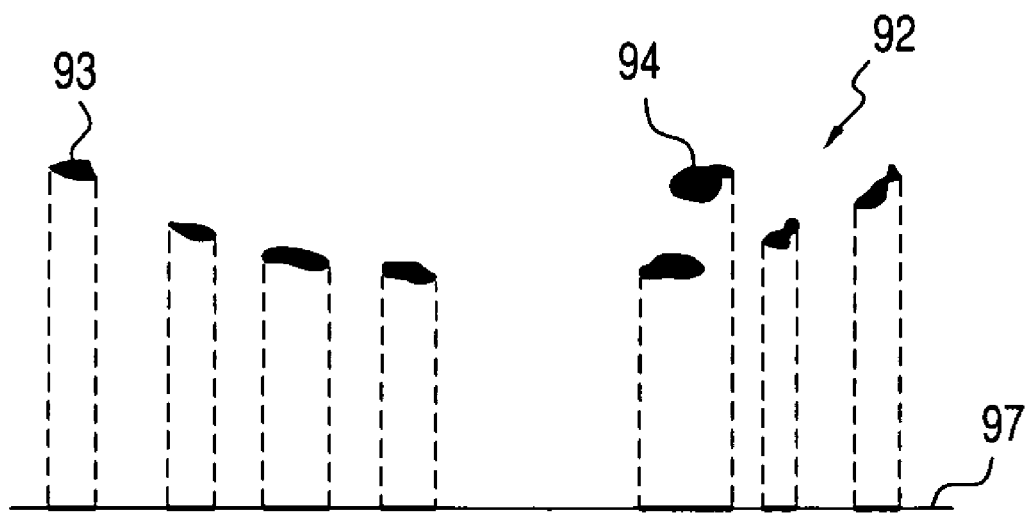

FIG. 11 schematically represents a differential image 92, in which the window thread perforations 91 are shown in dark fields 93, such as, for example, in window threads 93. In this case, the dark field 94 was caused by a print error 94 and not by a window thread perforation 91. Furthermore, a window thread perforation 91 in the center is not pictured because of the insufficient color difference between the background and the window thread 93.

To simplify the comparison between the mask reference 89 and the differential image 92 for position finding, the mask reference 89 is projected onto a projection line 96, and the light-dark distribution resulting from this projection is compared with the light-dark distribution resulting from the projection of the reference image 92 onto a projection line 97. By the use of this one-dimensional comparison of the light-dark distribution it is possible to determine the position of the window thread 93 in one direction.

While preferred embodiments of methods for the qualitative evaluation of a material with at least one identifying characteristic, in accordance with the present invention, have been set forth fully and completely hereinabove, it will be apparent to one of skill in the art that various changes in, for example, the types of press used to print the material to be evaluated, the specific computer used, and the like could be made without departing from the true spirit and scope of the present invention which is accordingly to be limited only by the appended claims.

What is claimed is:

1. A method for the qualitative evaluation of a material having at least one identifying characteristic including:
   providing an electronic image sensor;
   recording a color image of said identifying characteristic of said material using said electronic image sensor;
   obtaining at least one first electrical signal from said electronic image sensor, said at least one first electronic signal being correlated with said color image;
   providing an evaluating device connected with said electronic image sensor;
   using said evaluating device for evaluating said at least first electronic signal;
   providing at least one reference image of the material having at least one identifying characteristic;
   obtaining a second electrical signal from said at least one reference image;
   storing said at least one reference signal in a data memory;
   providing reference variables in said second electronic signal for at least two different properties of a reference image of said first electrical signal;
   comparing said first electrical signal with at least said two reference variables contained in said second electrical signal;
   checking at least said color image of said identifying characteristic for a deviation from said reference image; and
   checking said identifying characteristic regarding its association with one of a defined class of identifying characteristics and a defined geometrical contour and a relative arrangement with respect to at least one further identifying characteristic of said material.

2. The method of claim 1 further including accomplishing said qualitative evaluation of said material during operation of a running work process of a machine processing said material.

3. The method of claim 1 further including conducting at least two qualitative evaluations of said material independently of each other in concurrent checking processes.

4. The method of claim 1 further including storing said color image from said reference image in said data memory of said evaluating device during a learning mode of said evaluating device and using said stored reference image in said evaluating device after changing said evaluating device from said learning mode into a working mode.

5. The method of claim 3 further including conducting said checks during operation of a running work process of a machine processing said material.

6. The method of claim 4 further including conducting at least two checks independently of each other in parallel extending check processes.

7. The method of claim 2 further including storing said color image from said reference image in said data memory of said evaluating device during a learning mode of said evaluating device and using said stored reference image in said evaluating device after changing said evaluating device from said learning mode into a working mode.

8. The method of claim 4 further including storing at least a single reference image in said evaluation device during said learning mode.

9. The method of claim 2 further including imprinting said material during said running work process.

10. The method of claim 1 further including evaluating said material for controlling its quality.

11. The method of claim 1 further including said material as one of a bill and a stamp.

12. The method f claim 1 further including providing said material in a printed sheet and moving said printed sheet past said image sensor at a speed of up to 18,000 printed sheets per hour.

13. The method of claim 1 further including providing said material as a web of material and moving said web of material past said image sensor at a range of up to 15m/s.

14. The method of claim 1 further including varying a position of said at least one identifying characteristic within an expected range defined by tolerance limits.

15. The method of claim 1 further including providing said image sensor having a plurality of light-sensitive pixels.

16. The method of claim 15 further including providing said at least one first electrical signal from each of said plurality of pixels.

17. The method of claim 1 further including dividing said at least one first electrical signal into a plurality of signal channel.

18. The method of claim 17 further including providing said at least first electrical signal as an RGB signal and making available a portion of said RGB signal in each of said signal channels corresponding to one of the three basic colors red, green and blue.

19. The method of claim 17 further including providing a spectral sensitivity of each of said plurality of signal channels set to a defined spectral sensitivity of a human eye.

20. The method of claim 1 further including matching said first electrical signal in hue, fullness and brightness to a color perception of a human eye.

21. The method of claim 17 further including linking a first of said signal channels with a second of said signal channels by using a first calculation prescription and generating an output signal of a first compensation color channel, and linking a third of said signal channels with a portion of said first and second channels using a second calculation prescription and generating an output of a second compensation color channel, and comparing said outputs of said first and second confirmation color channels with reference variables.

22. The method of claim 21 further including storing said outputs of said first and second compensation color channels in said data memory.

23. The method of claim 22 further including providing said first calculation prescription for providing a weighted difference formation of a portion of said first electrical signal made available in said second signal channel from the corresponding portion in said first signal channel and further providing said second calculation prescription for providing a weighted difference formation of a weighted sum of portions of said first and second signal channels from a corresponding portion in said third signal channel.

24. The method of claim 21 further including subjecting at least one portion of said first electrical signal in said plurality of signal channels to a transformation by using a calculation prescription.

25. The method of claim 21 further including providing said transformation as a nonlinear transformation.

26. The method of claim 21 further including weighting each of said portions of said first electrical signal with a coefficient.

27. The method of claim 21 further including filtering said output signal of at least one of said first and second compensation color channels using a low pass filter.

28. The method of claim 27 further including providing said low pass filter as a Gauss low pass filter.

29. The method of claim 21 further including storing said output signals of said first and second compensation color channels produced by at least one reference image as reference variables in said data mode during operation in a learning mode and further including confirming said output signals of said first and second compensation color channels generated by said identifying characteristic to be checked with said reference variables stored in said data memory during a working mode.

30. The method of claim 21 further including accomplishing a comparison of said output signals of said first and second compensation color channels from said identifying characteristic to be checked with said reference variables for each pixel of said image sensor.

31. The method of claim 30 further including storing output signals from several reference images as reference variables and using said several reference images for defining a tolerance window for said reference variables.

32. The method of claim 21 further including providing a classification system and using said system for classification of said output signals of said compensation color channels.

33. The method of claim 32 further including providing said clarification system as at least one of linear clarification systems, non-linear classification systems, threshold value classification systems, Euclidic distance classification devices, Bayes classification devices, fuzzy classification devices and artificial neuronal networks.

34. The method of claim 1 further including converting said first electrical signal from said image sensor, using at least one calculation prescription, to a translation-invariable signal with at least one characteristic value, weighing said at least one characteristic value with at least one fuzzy association function; generating a higher order fuzzy association function by linking all association functions by using a calculation prescription consisting of at least one rule; determining a sympathetic value from said higher order fuzzy association function; comparing said sympathetic value with a threshold value and making a decision regarding an association of said indentifying characteristic as a function of a result of said comparison.

35. The method of claim 34 further including providing a grid of several image windows, with each of said image windows consisting of several pixels and placing said grid over said color image.

36. The method of claim 35 further including dividing said color image into M × N of said image windows each having m × n pixels and providing M, N, m and n each greater than 1.

37. The method of claim 34 further including providing said association characteristic having a functional connection with a value range of said characteristics value.

38. The method of claim 37 further including providing said association function with at least one determine parameter.

39. The method of claim 34 further including providing said calculation prescription for converting said first electrical signal from said image sensor into said translation-invariable characteristic value using a two-dimensional mathematical spectral transformation method.

40. The method of claim 39 further including providing said two-dimensional mathematical spectral transformation as one of a two-dimensional Fourier, Walsh, Hadamard and circular transformation.

41. The method of claim 39 further including providing said characteristics value as represented by an amount of a spectral coefficient.

42. The method of claim 35 further including determining said two-dimensional spectra from said first electrical signal made available from said image sensor for each pixel for each image window.

43. The method of claim 42 further including providing spectral amplitude values determined from said two-dimensional spectra and linking said spectral amplitude values to form a single sympathetic value for each said image window.

44. The method of claim 34 further including providing said association functions as unimodal functions.

45. The method of claim 34 further including providing said higher order association function as a multi-modal function.

46. The method of claim 34 further including providing at least one of said association functions and said higher order function as a potential function.

47. The method of claim 34 further including conforming at least one parameter or delivering at least one threshold value in said learning mode and evaluating said first electrical signal made available by said image sensor, in said working mode, on the basis of said results from said learning mode.

48. The method of claim 34 further including providing said calculation function, by which said association functions are compared with each other, as a conjunctive association function within the meaning of IF . . . THEN linkage.

49. The method of claim 34 further including generating said higher order fuzzy association function by processing the partial steps of premise evaluation, activation and aggregation, delivering a sympathetic value, during the course of said premise evaluation, for each IF portion of a calculation pre-scripting, determining an association function for each IF . . . THEN calculation prescription and during aggregation, said higher order association function is generated by overlapping all of said association functions during said activation.

50. The method of claim 34 further including determining said sympathetic value in accordance with one of a focus and a maximum method.

51. The method of claim 1 further including checking of said identifying characteristics by storing at least one background reference variable and at least one mask reference variable in said data memory, said background reference variable representing at least one property of the material to be evaluated in at least one portion of an expected range surrounding said identifying characteristic, and said mask reference variable representing one of a geometric contour of said identifying characteristic and the relative arrangement of several identifying characteristics; forming a differential value from said electrical signal made by said image sensor and said background reference variable, deriving an actual position of said identifying characteristic by comparing said differential value with said mask reference variable and blanking out an area of the material to be a evaluated resulting from said actual portion of said identifying characteristic.

52. The method of claim 51 further including using said background reference variable as representing a gray value of an expected range surrounding said identifying characteristic.

53. The method of claim 51 further including storing a binary formation threshold in said data memory and filtering out of said differential value all first electrical signals made available by said image sensor whose values fall below said binary formation threshold.

54. The method of claim 51 further including conforming said mask reference variable until a maximum agreement between said mask reference variable and said differential value results.

55. The method of claim 51 further including conforming a foci of said mask reference variables with a foci of said differential value in the course of said determination of the portion of said identifying characteristic.

56. The method of claim 55 further including assuming said position values are an actual position of said identifying characteristic upon a minimal deviation resulting during said comparison of said foci of said mask reference variable with said foci of said differential value.

57. The method of claim 51 further including selecting said identifying characteristic in the form of strip-shaped sections.

58. The method of claim 51 further including providing said identifying characteristic as a security characteristic of one of a bill and a stamp.

59. The method of claim 51 further including providing said identifying characteristic as one of a window thread perforation, a hologram and a kinegram.

60. The method of claim 51 further including selecting said material without an identifying characteristic, using said material in a learning mode, and deriving said background reference value from at least one property of said material to be evaluated in the expected range.

61. The method of claim 51 further including using said material with said identifying characteristic for delivering said background reference variable in a learning mode wherein in case of said identifying characteristic appearing bright in comparison with an expected range, said background reference variable is derived as a threshold value from values of darkest image points of said identifying characteristic and wherein in case of said identifying characteristic appearing dark in comparison with said expected range, said background reference variable is derived as a threshold value from values of brightest image points of said identifying characteristic.

62. The method of claim 51 further including delivering different background reference variables for different areas of said material.

63. The method of claim 51 further including projecting said mask reference variable and said differential value onto at least one projection line and deriving an actual position of said identifying characteristic in a longitudinal direction of said projection line from a comparison of the projection data of said mask reference value and said differential value.

64. The method of claim 51 further including checking said identifying characteristic using mathematical operations digitized input data.

65. The method of claim 17 further including providing said first electrical signal as a signal value having coefficients representing portions of said first electrical signal made available by said image sensor in different signal channels; multiplying said coefficients by a correction matrix for obtaining a corrected signal vector; and supplying said corrected signal vector to a color monitor for representing a color image on said color monitor on the basis of said corrected signal vector for qualitatively evaluating said color image.

66. The method of claim 65 further including providing said correction matrix as a quadratic matrix.

67. The method of claim 64 further including determining coefficients of said correction matrix using an iterative approximation algorithm in which a reference color chart has been preset and in which different reference colors are represented in several color fields, wherein for each color field of said reference color chart a vector with reference values have been preset, wherein a color image from the reference color chart is recorded by said image sensor, wherein a color vector is determined for each color field and where, in a first iteration step said signal vectors for all of said color fields are multiplied by said correction matrix and further wherein said coefficients of said correction matrix are changed in each subsequent iteration step for bringing said corrected signal vector iteratively close to said vectors with said preset reference variables.

68. The method of claim 67 further including evaluating an approach of said corrected signal vectors to said vectors with said preset reference variables for each iteration step, determining a differential value between said corrected signal vector and said vector with said preset reference variables for each said color field of said reference color chart, adding up a sum of all of said differential values and assuming a change of said coefficients of said correction matrix in said actual iteration step for a subsequent iteration step only if a sum of all differential values in the actual iteration step has become smaller in comparison with a sum of all differential values in a previous iteration step.

69. The method of claim 65 further including changing said signal vector in a further correction step for matching color balance, brightness and contrast, in addition to said correction with said correction matrix, by adding the product of a multiplication by said coefficients of each signal vector by signal channel-dependent correction factors, as a correction vector, to each signal vector.

70. The method of claim 69 further including determining said coefficients of said correction vector and said signal channel-dependent correction factors by presetting a reference color chart, in which different reference colors are represented in several color fields, wherein a vector with reference variables has been preset for each color field of said reference color chart, wherein a color image from said reference color chart is recorded by said image sensor, wherein a signal vector is determined for each color field, wherein said correction vector and said correction factors are selected in such a way that corrected signal vectors for two color fields having reference gray values black and white, which are obtained by appropriate addition with the correction vectors and by use of a multiplication with said signal channel-dependent correction factors again with said preset variables for these two color fields.

71. The method of claim 69 further including performing said correction step for matching said color balance brightness and contrast prior to said multiplication with said correction matrix.

72. The method of claim 65 further including providing said image sensor having a plurality of pixels arranged flat, with each said pixel providing at least one of said signal vectors.

73. The method of claim 72 further including changing said signal vector in a further correction step, in addition to said correction with said correction matrix, for conforming the intensity values, whereby said coefficients of said corrected or uncorrected signal vectors, determined for each pixel, are each multiplied with signal channel-dependent correction factors which have been specifically preset for each said pixel.

74. The method of claim 73 further including determining said pixel-specific signal channel-dependent correction factors by lining an observation area of said image sensor with a white homogenous colored material, recording a color image using said image sensor, determining a signal vector for each pixel, defining a particular signal vector representing a brightest location in said observation area, and wherein said pixel-specific signal channel-dependent correction factors are determined for each said pixel whereby a result of a multiplication of said correction factors with said coefficients of said respective corresponding signal vectors agrees with said coefficients of said signal vectors at said brightest location in said observation area.

75. The method of claim 74 further including illuminating said observation area during said determination of said pixel-specific signal channel-dependent correction factors corresponding to the illumination of said image sensor during said qualitative evaluation of said material.

76. The method of claim 73 further including performing said correction step for matching said intensity levels after said multiplication with said correction matrix.

77. The method of claim 76 further including raising each of said coefficients used as the basis for said corrected signal vectors to a higher power by a factor before being transmitted to said color monitor.

78. The method of claim 77 further including selecting said factor having a value between 0.3 and 0.5.

79. The method of claim 77 further including selecting said factor as 0.45.

80. The method of claim 65 further including changing said signal vectors in a further correction step, in addition to said correction by said correction matrix, for matching illumination conditions, with said coefficients of said corrected signal vectors correspond to a result which is obtained when said observation area is illuminated with normal light.

81. The method of claim 65 further including providing said reference color chart as an IT8chart with 288 color fields.

82. The method of claim 65 further including specifying said vectors with said reference variables for said signal channels by converting CIELAB color values, which are known for the color fields of the reference chart, into appropriate coefficients for said signal channels.

* * * * *

UNITED STATES PATENT AND TRADEMARK OFFICE
CERTIFICATE OF CORRECTION

PATENT NO. : 7,447,353 B2
APPLICATION NO. : 10/550889
DATED : November 4, 2008
INVENTOR(S) : Carsten Diederichs et al.

It is certified that error appears in the above-identified patent and that said Letters Patent is hereby corrected as shown below:

Claim 38, Line 2, after "one", change "determine" to --determined--;
Claim 49, Line 5, after "calculation", change "prescripting" to --prescription--; and
Claim 67, Line 1, after "claim", change "64" to --65--.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,447,353 B2 | Page 1 of 1 |
| APPLICATION NO. | : 10/550889 | |
| DATED | : November 4, 2008 | |
| INVENTOR(S) | : Carsten Diederichs et al. | |

It is certified that error appears in the above-identified patent and that said Letters Patent is hereby corrected as shown below:

Claim 38, Line 44, after "one", change "determine" to --determined--;
Claim 49, Line 20, after "calculation", change "prescripting" to --prescription--; and
Claim 67, Line 47, after "claim", change "64" to --65--.

This certificate supersedes the Certificate of Correction issued April 14, 2009.

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,447,353 B2                                             Page 1 of 1
APPLICATION NO.  : 10/550889
DATED            : November 4, 2008
INVENTOR(S)      : Carsten Diederichs et al.

It is certified that error appears in the above-identified patent and that said Letters Patent is hereby corrected as shown below:

Column 24, Claim 38, Line 44, after "one", change "determine" to --determined--;
Column 25, Claim 49, Line 20, after "calculation", change "prescripting" to --prescription--; and
Column 26, Claim 67, Line 47, after "claim", change "64" to --65--.

This certificate supersedes the Certificates of Correction issued April 14, 2009 and May 5, 2009.

Signed and Sealed this

Twenty-sixth Day of May, 2009

JOHN DOLL
*Acting Director of the United States Patent and Trademark Office*